(12) United States Patent
Yoo et al.

(10) Patent No.: US 11,406,226 B2
(45) Date of Patent: Aug. 9, 2022

(54) LEG CARE APPARATUS AND METHOD FOR CONTROLLING THE SAME

(71) Applicant: LG ELECTRONICS INC., Seoul (KR)

(72) Inventors: Hyunsun Yoo, Seoul (KR); Jaehung Chun, Seoul (KR); Joogyeom Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 16/843,353

(22) Filed: Apr. 8, 2020

(65) Prior Publication Data

US 2021/0022565 A1 Jan. 28, 2021

(30) Foreign Application Priority Data

| Jul. 24, 2019 | (KR) | 10-2019-0089654 |
| Jul. 24, 2019 | (KR) | 10-2019-0089661 |
| Jul. 24, 2019 | (KR) | 10-2019-0089663 |
| Jul. 24, 2019 | (KR) | 10-2019-0089664 |
| Jul. 24, 2019 | (KR) | 10-2019-0089692 |
| Jul. 24, 2019 | (KR) | 10-2019-0089708 |

(51) Int. Cl.
*A47K 3/022* (2006.01)
*A47K 3/00* (2006.01)
*G01V 11/00* (2006.01)

(52) U.S. Cl.
CPC .............. *A47K 3/022* (2013.01); *A47K 3/001* (2013.01); *G01V 11/00* (2013.01)

(58) Field of Classification Search
CPC ..................................................... A47K 3/022
USPC ............ 4/574.1, 573.1, 575.1, 576.1, 577.1, 4/578.1, 589
See application file for complete search history.

(56) References Cited

FOREIGN PATENT DOCUMENTS

| DE | 202006015002 U1 | 12/2006 |
| KR | 100367292 B1 | 2/2003 |
| KR | 10-2011-0010331 A | 2/2011 |
| KR | 20120031205 A | 3/2012 |
| WO | 9742926 A1 | 11/1997 |

*Primary Examiner* — Lori L Baker
(74) *Attorney, Agent, or Firm* — Dentons US LLP

(57) ABSTRACT

A leg care apparatus includes a main body configured to provide an action space in which a leg is accommodated, an action space adjustment module configured to adjust a size of an inlet of the action space, at least one proximity sensor configured to sense a user's access, and a controller configured to control the action space adjustment module in response to at least one sensing signal.

20 Claims, 22 Drawing Sheets

LEG CARE APPARATUS AND METHOD FOR CONTROLLING THE SAME

CROSS-REFERENCE TO RELATED APPLICATIONS

The present application claims priority under 35 U.S.C. 119 and 35 U.S.C. 365 to Korean Patent Application Nos. 10-2019-0089654, 10-2019-0089661, 10-2019-0089663, 10-2019-0089664, 10-2019-0089692, 10-2019-0089708, all filed on Jul. 24, 2019, which are hereby incorporated by reference in their entirety.

BACKGROUND

The present disclosure relates to a leg care apparatus.

Foot bath is an action where user's feet are soaked in hot water for a predetermined time.

The foot bath is an action where heat is applied to the user's feet. In detail, the foot bath is known to be effective in improving various ailments such as blood circulation improvement, body temperature rise, improvement in feeling cold, improvement in sleep disorders, waste discharge, ingrown toenail prevention, plantar fasciitis improvement, stress relief, skin care, and the like by using heat transferred indirectly to the human body through the feet.

A device that provides hot water up to a height of the vicinity of an ankle to allow the user to soak their feet is widely known as a foot bath device that is capable of performing a foot bath. The foot bath device using water has limitations in that heat loss is large, the device is difficult to handle, and its use is troublesome because the feet have to be conduction-heated indirectly by heating water.

To solve these limitations, a foot bath device in which a heating element is provided inside a control space, and the foot bath is performed by using radiant heating using the heating element is being introduced. A foot bath machine using radiant heating is disclosed in Korean Patent registration No. 10-1145430.

The above-described device has the following limitations. First, there is inconvenience in that a user control panel is complicated to operate. Second, there is a limitation in that user's safety is threatened because a heating element is used. Third, there is a limitation in that the storage and movement of the device are difficult. Fourth, there is a limitation in that the device is frequently damaged due to having no rigidity. Fifth, it is troublesome to use because the control space is blocked by a plate. Sixth, there is a limitation in that only fomentation using the radiant heat is enabled in a radiant heating manner.

SUMMARY

Embodiments provide a leg care apparatus that includes a foot bath device to care a leg.

Embodiments also provide a leg care apparatus which is conveniently operated and used by a user.

Embodiments also provide a leg care apparatus in which a temperature control state is safely applied to a user's leg.

Embodiments also provide a leg care apparatus that is conveniently moved and stored.

Embodiments also provide a leg care apparatus that is prevented from being damaged due to rigidity and is easy to be handled by a user.

Embodiments also provide a leg care apparatus that is capable of being used variously and conveniently by a user.

Embodiments also provide a leg care apparatus that is capable of being used more conveniently and frequently in real life.

Embodiments also provide a leg care apparatus that is automatically operated and capable of being used more safely.

In one embodiment, a leg care apparatus includes: a main body configured to provide an action space in which a leg is accommodated; an action space adjustment module configured to adjust a size of an inlet of the action space; at least one proximity sensor configured to sense a user's access; and a controller configured to control the action space adjustment module in response to at least one sensing signal. According to the present disclosure, it may be unnecessary to perform a separate manual manipulation of the leg care apparatus to insert the user's leg into the action space by automatically opening the action space adjustment module.

The at least one proximity sensor may include a first proximity sensor configured to sense the user's access from the outside of the action space. Accordingly, the action space adjustment modules may be controlled to automatically open the inlet according to a sensing signal of the first proximity sensor. Thus, a user that may access the leg care apparatus may be accurately sensed, and the leg care apparatus may be stably operated.

The at least one proximity sensor may be a second proximity sensor configured to sense that a user is properly located within the action space. At least one of the upper module or the side module may be controlled to close the inlet according to a sensing signal of the second proximity sensor. Thus, the user whose leg is inserted into the action space may be accurately sensed, and the apparatus may be stably operated.

The action space adjustment module may include at least one of: an upper module configured to define at least a portion of a top surface of the action space, the upper module being configured to open or close the inlet; or a side module configured to define at least a portion of a front surface of the action space, the side module being configured to open or close the inlet. Since the inlet of the action space is opened and closed in various manners, the result desired by the user may be selected to be used.

At least one of the upper module or the side module may be controlled to open the inlet according to a sensing signal of the at least one proximity sensor. Accordingly, the action space may be controlled in various manners.

The proximity sensor may include: a first proximity sensor configured to sense the user's access from a front side of the action space; and a relay configured to delay a sensing signal of the first proximity sensor, and thereby to transmit a delayed sensing signal to the controller. Accordingly, collision between the user and the apparatus may be prevented to prevent the user from being injured.

The leg care apparatus may further include a side module configured to define at least a portion of a front surface of the action space, the side module being configured to open or close the inlet, wherein the first proximity sensor may be provided in the side module within a range of one-third of a center with respect to a left and right length of the side module. Accordingly, when being opened in the user's access direction, the injury due to the collision may be prevented. Also, since the user passing through one corner is not sensed, the leg care apparatus may unnecessarily not open the inlet.

The first proximity sensor may have a sensing range having a fan shape. Thus, the user disposed in the vicinity of a front vertex of the apparatus may not be sensed to prevent the user from unintentionally colliding with the leg care apparatus.

The proximity sensor may include: a second proximity sensor configured to sense the user's access into the action space; and a relay configured to delay a sensing signal of the second proximity sensor, and thereby to transmit a delayed sensing signal to the controller. Accordingly, after the user inserts the leg, the user may have time to secure their posture, and the user may safely and conveniently use the apparatus.

The leg care apparatus may further include an upper module configured to define at least a portion of a top surface of the action space, the upper module being configured to open or close the inlet, wherein the second proximity sensor may be provided in the upper module within a range of one-third of a center with respect to a left and right length of the upper module. Accordingly, malfunction due to false sensing may be prevented.

The second proximity sensor may sense at least one of user's abdomen or thigh to accurately sense the user.

The leg care apparatus may further include a manipulation part configured to manipulate the action space adjustment module. The manipulation part may be provided with a side table mode part in which the upper module is moved upward to a preset height so that a top surface of the upper module is used as a side table. Accordingly, when the user intents to use the leg care apparatus as a side table, the leg care apparatus may be conveniently manipulated.

The manipulation part may be provided with a memory setting part configured to remember the present state of the action space adjustment module. Accordingly, since a height and an opening state, which are desired by the user, are stored, a mode of the leg care apparatus, which is suitable for the user, may be stored in advance.

The leg care apparatus may further include: an upper portion top surface part provided to be flat on an upper portion of the upper module; and an upper plate made of a rubber material and placed on the upper portion top surface part. Accordingly, the leg care apparatus may be used for various purposes in an indoor space such as a side table, among others. Also, there may be an advantage in that the functionality increases, such as reading while having a foot bath.

The upper portion top surface part may include at least one of: a wireless charging part configured to wirelessly charge an electronic equipment; a water supply part configured to receive water; or a display configured to display information to a user. Thus, the additional functions may be used to improve the user's convenience.

The leg care apparatus may further include: a power sensing part configured to sense interruption of an external power; and a battery configured to store energy, wherein the controller may control the action space module to open the action space when the interruption of the external power is sensed by the power sensing part during the leg care. Accordingly, safety accidents may be prevented because the user's leg is trapped in the action space during power failure.

The controller may control the action space module to open the action space when a user is sensed by the at least one proximity sensor, thereby preventing an unnecessary operation.

The leg care apparatus may further include a memory in which a progress of a sequence for the leg care is stored. Thus, even though a sensing sensor for sensing the user is not provided, the leg care apparatus may be used.

In another embodiment, a method for operating a leg care apparatus includes: sensing user's access to automatically open an inlet; and sensing a state in which a user's leg is disposed in an action space to automatically close the inlet. Thus, the user, in particular, the elderly may conveniently use the leg care apparatus.

The method may further include: sensing the user's access by a first proximity sensor; and delay a user sensing signal, which is sensed by the first proximity sensor, through a relay. Thus, the user may more safely use the leg care apparatus.

The method may further include: sensing insertion of the user's leg into the action space by a second proximity sensor; and delay a user sensing signal, which is sensed by the second proximity sensor, through a relay. Thus, the user may more safely use the leg care apparatus.

In further another embodiment, a method for controlling a leg care apparatus, in which an inlet of an action space is adjusted by an action space adjustment module, includes: inserting a user's leg, starting an operation of the leg care apparatus; and automatically opening the inlet of the action space adjustment module when an external power is cut off. Accordingly, the user's leg may be prevented from being trapped inside the action space, thereby preventing safety accidents.

The details of one or more embodiments are set forth in the accompanying drawings and the description below. Other features will be apparent from the description and drawings, and from the claims.

BRIEF DESCRIPTION OF THE DRAWINGS

FIGS. 1 and 2 are front perspective views of a leg care apparatus according to an embodiment, wherein FIG. 1 illustrates a state in which the leg care apparatus is stored, and FIG. 2 illustrates a state in which the leg care apparatus is operated.

FIGS. 9 and 10 are views of a proximity sensor that senses a user in the leg care apparatus according to an embodiment, wherein FIG. 9 is a front view, and FIG. 10 is a side view.

DETAILED DESCRIPTION OF THE EMBODIMENTS

Hereinafter, exemplary embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components. Thus, it should be understood that they are also included within the scope of the present invention.

Figure 1:
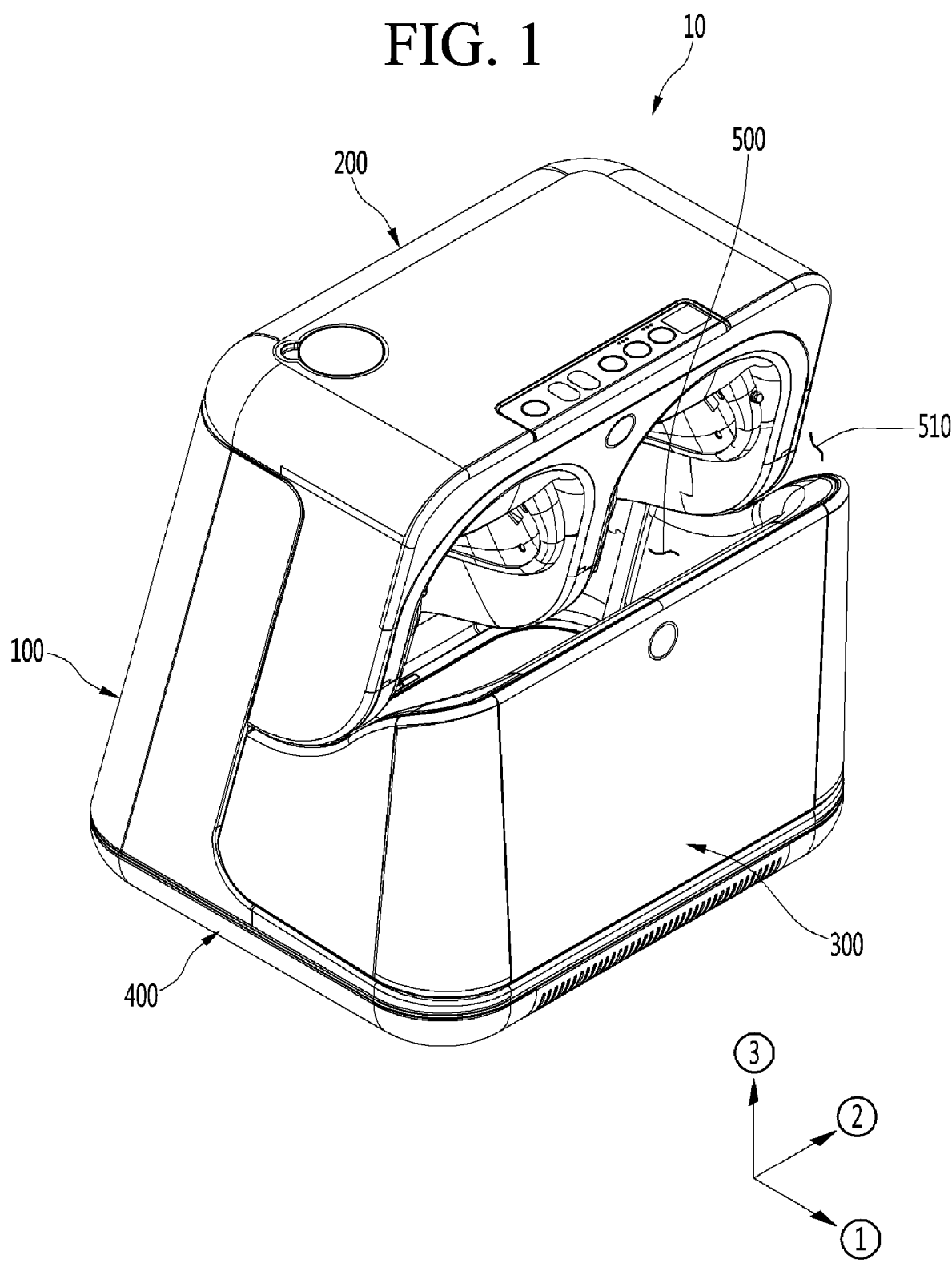
Figure 2:
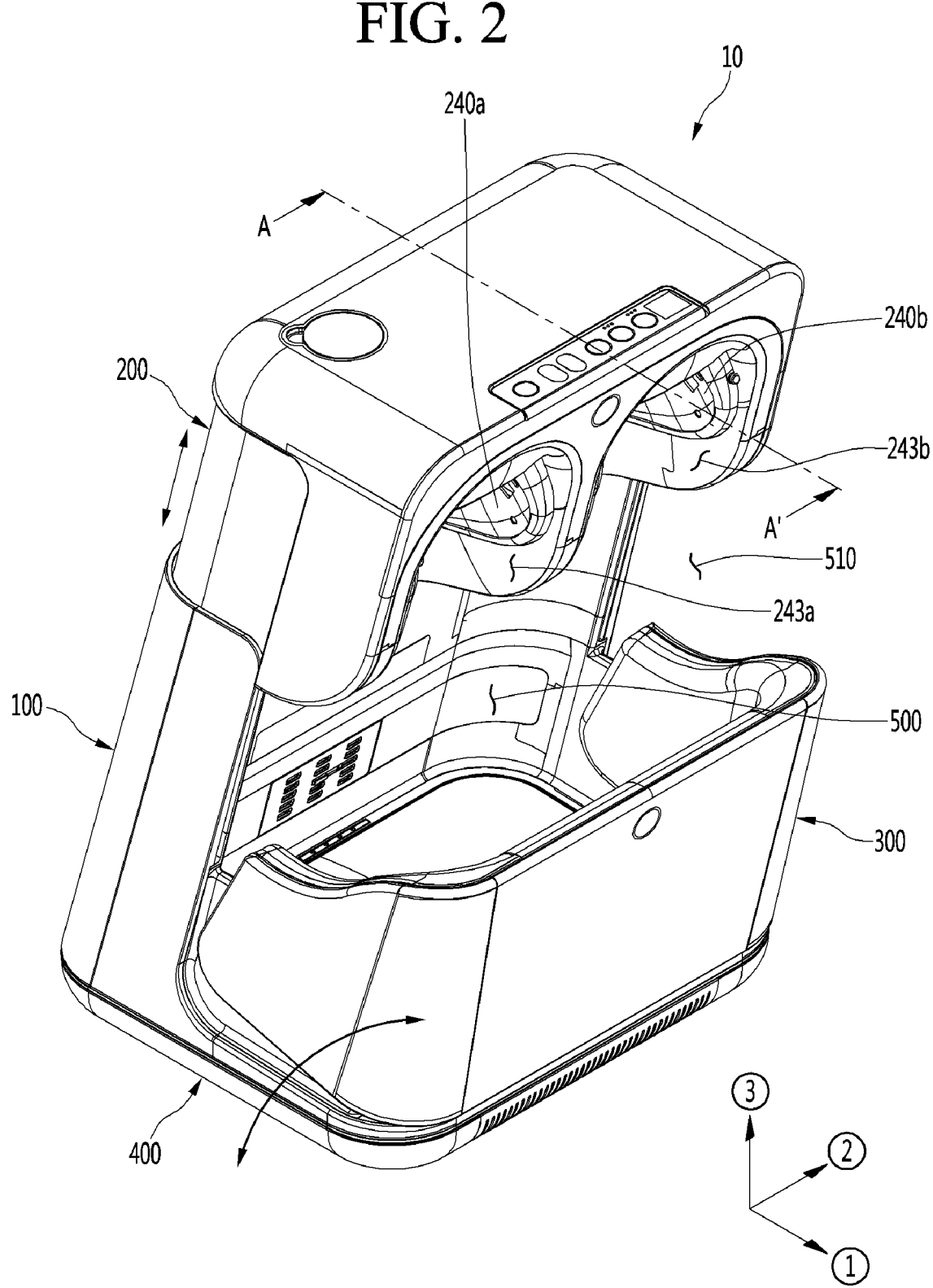

FIGS. 1 and 2 are front perspective views of a leg care apparatus according to an embodiment. That is, FIG. 1 illustrates a state in which the leg care apparatus is stored, and FIG. 2 illustrates a state in which the leg care apparatus is operated. Here, the storage state may mean a state in which the leg care apparatus has the smallest size or is not in use. The operation state may mean a state in which the leg care apparatus is expanded so that a user may insert their leg or a state in which the leg care apparatus is moved for use.

In the description of the drawings, a direction in which the user accesses the leg care apparatus indicates a front side. When based on each axis shown in the figures, the front and rear direction is expressed as ①, and the direction in which the user accesses the leg care apparatus indicates the front side. A left and right direction is expressed as ② and indicates a left and right direction of the front side with respect to the user. An upward and downward direction is expressed as ③ and indicates an upward and downward direction of the front side with respect to the user.

In the leg care apparatus according to an embodiment, in order to allow the user's leg to be inserted, an inlet may increase in size, and an inner action space may increase in volume. After the user's leg is inserted, the inlet may decrease in size to be suitable for the user's body, and the action space may decrease in volume to be suitable for the user's leg. Since the action space and the inlet are adjusted to be suitable for a body size of the user, particularly, a size and length of the leg, a thermal effect acting on the leg may be largely and quickly applied, and energy consumption may be saved.

According to an embodiment, the leg may be cared for by applying hot or cold air and/or pressure to a leg portion including portions of knees, calves, and thighs together with the feet.

In the following description, the meaning of the foot bath not only means foot bath using water pressure and heat applied in the water, but also applying heat, cold air, and pressure to a leg portion including portions of feet, knees, calves, and thighs.

Referring to FIGS. 1 and 2, a leg care apparatus 10 according to an embodiment includes a main body 100, an upper module 200 connected to an upper portion of the main body 100 to largely open an upper space of the leg care apparatus 10, a side module 300 connected to a front portion of the main body 100 to largely open an inner space of the leg care apparatus 10, and a bottom module 400 connected to a lower portion of the main body 100 to accommodate components that are required for operation of the leg care apparatus 10.

An action space 500 is provided in an inner space inside an inner surface of each of the main body 100, the upper module 200, the side module 300, and the bottom module 400. The action space 500 is a space for applying hot or cold air to a user's leg through at least one manner of conduction, convection, or radiation. An inlet 510 through which the user's leg is inserted and withdrawn is provided in front of the action space 500. Since at least one of the hot or cold air is applied to the user's leg in at least one manner of the conduction, convection, or radiation, the user may have a foot bath in a manner selected from various manners that are desired by the user.

The upper module 200 may perform a vertical elevation operation.

When the upper module 200 is moved upward, the inlet 510 is largely opened so that the user may conveniently insert their leg into the action space 500. After the user inserts their leg into the action space 500, the upper module 200 may be moved downward. The upper module 200 may be moved downward until a portion of the user's leg touches or the action space 500 is constructed in a shape desired by the user. The upper module 200 may define at least a portion of a top surface of the action space.

The upper module 200 is provided to be slid vertically in the embodiment, but is not limited thereto. For example, the upper module 200 may be opened through a rotation operation or moved to a position desired by the user.

Knee care parts 240a and 240b, each of which having a recessed shape, may be provided at both left and right side at the front of the upper module 200. Inner surfaces of the knee care parts may be provided with knee placing parts 243a and 243b. Each of the knee placing parts is a portion that contacts the user's knee. The knee placing part may include a light emitting element and a pad. The light emitting element and the pad may apply at least one of heat or pressure to care the knee, thereby performing blood flow improvement, muscle stimulation, and pain improvement.

The knee care part 240 cares the knee by applying at least one of the heat or the pressure. The action space 500 cares the user's leg through conduction, convection, and radiation of the hot or cold air. According to an embodiment, the leg care apparatus may improve user's satisfaction by performing a suitable action for each location of the leg. Particularly, the action space 500 may function as a foot bath machine by performing a function of the foot bath, and the knee care part 240 may function as a knee massager. The leg care apparatus according to embodiment may perform at least the functions of the foot bath machine and the knee massager.

The side module 300 may perform the rotation operation forward and backward.

When the side module 300 rotates forward, the inlet 510 may be opened so that the user may conveniently insert their leg into the action space 500. After the user inserts their leg into the action space, the side module 300 may rotate backward. The side module 300 may rotate backwards until a portion of the user's leg touches, or the action space 500 is constructed in a shape desired by the user. The side module 300 may provide at least a portion of a front surface of the action space.

The side module 300 rotates backward and forward in this embodiment, but the embodiment is not limited thereto. For example, the side module 300 may be slid to be opened or adjusted to a position desired by the user.

As described above, in the leg care apparatus 10 according to an embodiment, the upper module 200 and the side module 300 are contracted when not in use. Accordingly, the leg care apparatus may be easily stored, moved, and handled in a state of being contracted in volume.

The upper module 200 and the side module 300 may be operable with respect to the main body 100. As a result, the action space may increase or decrease in volume. Thus, the functions such as the convenient handling, the foot bath that is suitable for the user, the leg contact, and the like may be performed. The upper module 200 and the side module 300 may perform the action of adjusting the size and shape of the action space. Thus, the upper module 200 and the side module 300 may be referred to as action space adjustment modules.

Figure 3:
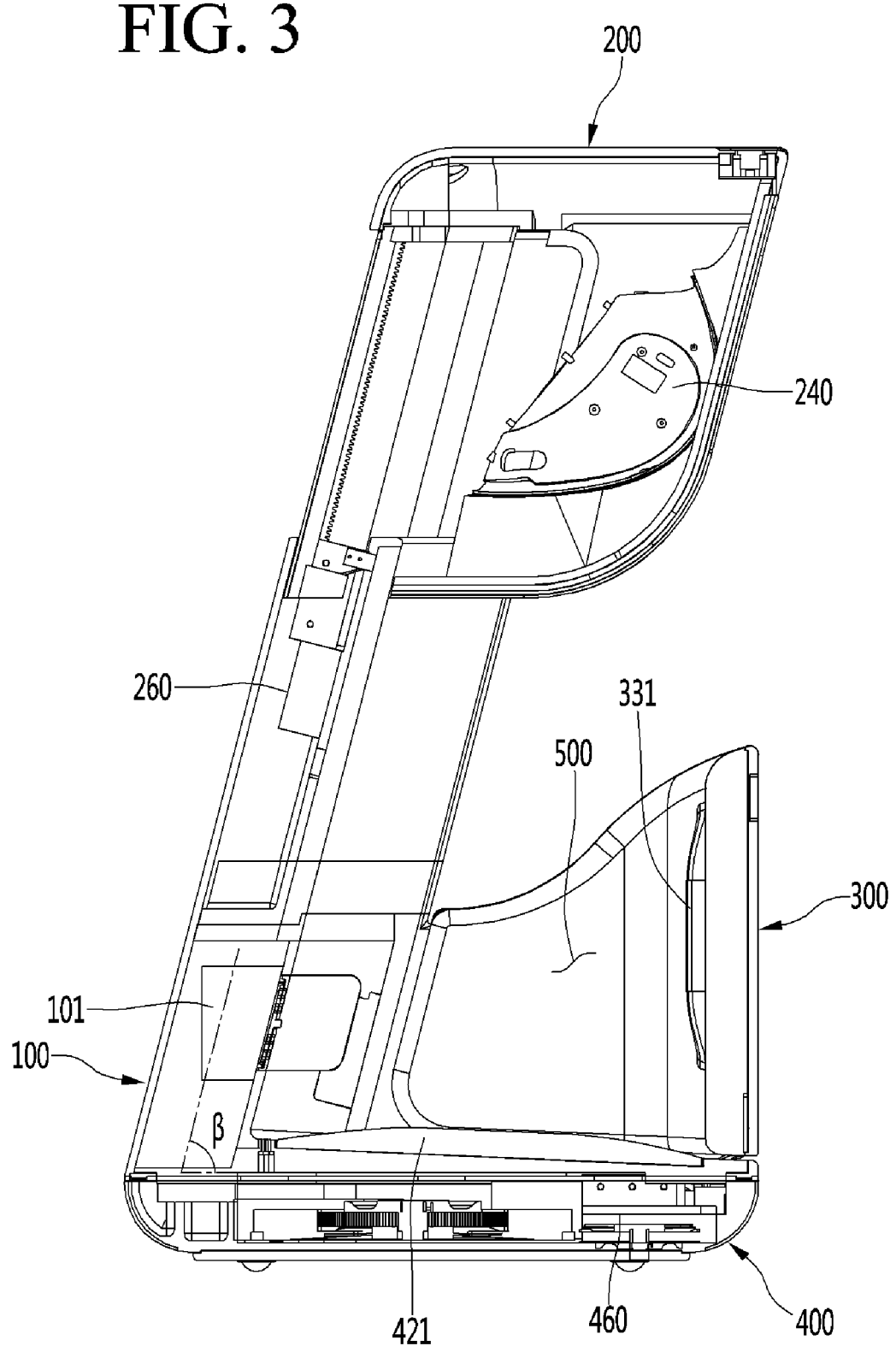
FIG. 3 is a schematic cross-sectional view taken along line A-A' of FIG. 2.

FIG. 3 is a schematic cross-sectional view taken along line A-A' of FIG. 2.

A schematic configuration and operation of the leg care apparatus according to an embodiment will be described with reference to FIG. 3. The main body 100 extends upward from a rear portion of the bottom module 400, and an upward extending angle is inclined forward at a predetermined angle β. Here, the inclined angle may be less than about 90 degrees as an acute angle. Since the main body 100 is inclined forward to extend, the user may not need to bend the knee excessively while inserting their leg into the action space 500 or while using the leg care apparatus.

Patients that need to care their leg by using the leg care apparatus may suffer from orthopedic diseases such as knee arthritis. The main body 100 may be provided to be inclined forward so that the action space 500 corresponds to a large bent angle of the user's leg without the patients having to excessively bend the knee. For example, the user may use the leg care apparatus even if the knee is not bent more than about 90 degrees.

Since a main vertical extension part (see reference numeral 111 of FIG. 5) of the main body 100 is provided to be inclined forward, other components related thereto may also be provided to be inclined.

The upper module 200 is provided on an upper portion of the main body 100. A vertical opening device 260 may be inserted into a contact part between the upper module 200 and the main body 100. The vertical opening device 260 may include a driving motor and a gear train and may move the upper module 200 upward or downward with respect to the main body 100.

The upper module 200 being moved upward may be when the inlet 510 is opened so that the user's leg is inserted into the action space 500. Alternatively, the upper module 200 may be moved upward even when the user withdraws their leg from the action space 500. The upper module 200 being moved downward may be when the inlet 510 decreases in size, or the action space is contracted after the user inserts their leg.

The knee care part 240 may be disposed on a front portion of the upper module 200 to care the user's knee.

A blower 101 may be provided below the main body 100. The blower 101 may provide hot air into the action space 500. The hot air of the blower 101 may be heated by a heating wire provided in the blower 101. The blower 101 may perform an action for forced convection of air heated by an external separate heating device.

The bottom module 400 may be disposed on a bottom part of the leg care apparatus to support the entire apparatus at a lower side. A foot contact pad 421 may be disposed on a top surface of the bottom module 400. A sole of the foot may contact the foot contact pad 421. The foot contact pad 421 may perform a foot bath function by conducting a temperature atmosphere controlled by an external force to the user's foot.

A front and rear opening device 460 may be disposed on a front portion of the bottom module 400. The front and rear opening device 460 may include a motor and a gear train and may be inserted into a contact part between the bottom module 400 and the side module 300. The front and rear opening device 460 may move the side module 300 forward and backward with respect to the main body 100.

A calf contact pad 331 may be disposed on an inner surface of the side module 300. A user's calf may contact the calf contact pad 331. The calf contact pad 331 may perform a foot bath function by conducting a temperature atmosphere controlled by an external force to the user's calf.

The side module 300 rotating forward may be when the inlet 510 is opened so that the user's leg is inserted into the action space 500. Alternatively, the side module 300 may be moved forward even when the user withdraws their leg from the action space 500. The side module 300 being moved backward may be when the inlet 510 decreases in size, and the action space is contracted, or the calf contacts the calf contact pad 331 after the user inserts their leg.

When the upper module 200 and the side module 300 open the inlet 510, the upper module 200 may start the opening thereof first, and then, the side module 300 may be opened. This is done because the upper module 200 performs the sliding operation, while the side module 300 rotates, and thus, if the side module 300 rotates forward first, the side module 300 may interfere with the upper module 200.

When the upper module 200 and the side module 300 close the inlet 510, the upper module 200 and the side module 300 may be operated in reverse. For example, the side module 300 may be closed first at a predetermined angle, and then the side module 300 may be closed. Since the respective modules are operated in this order, the interference between the modules may be prevented.

Figure 4:
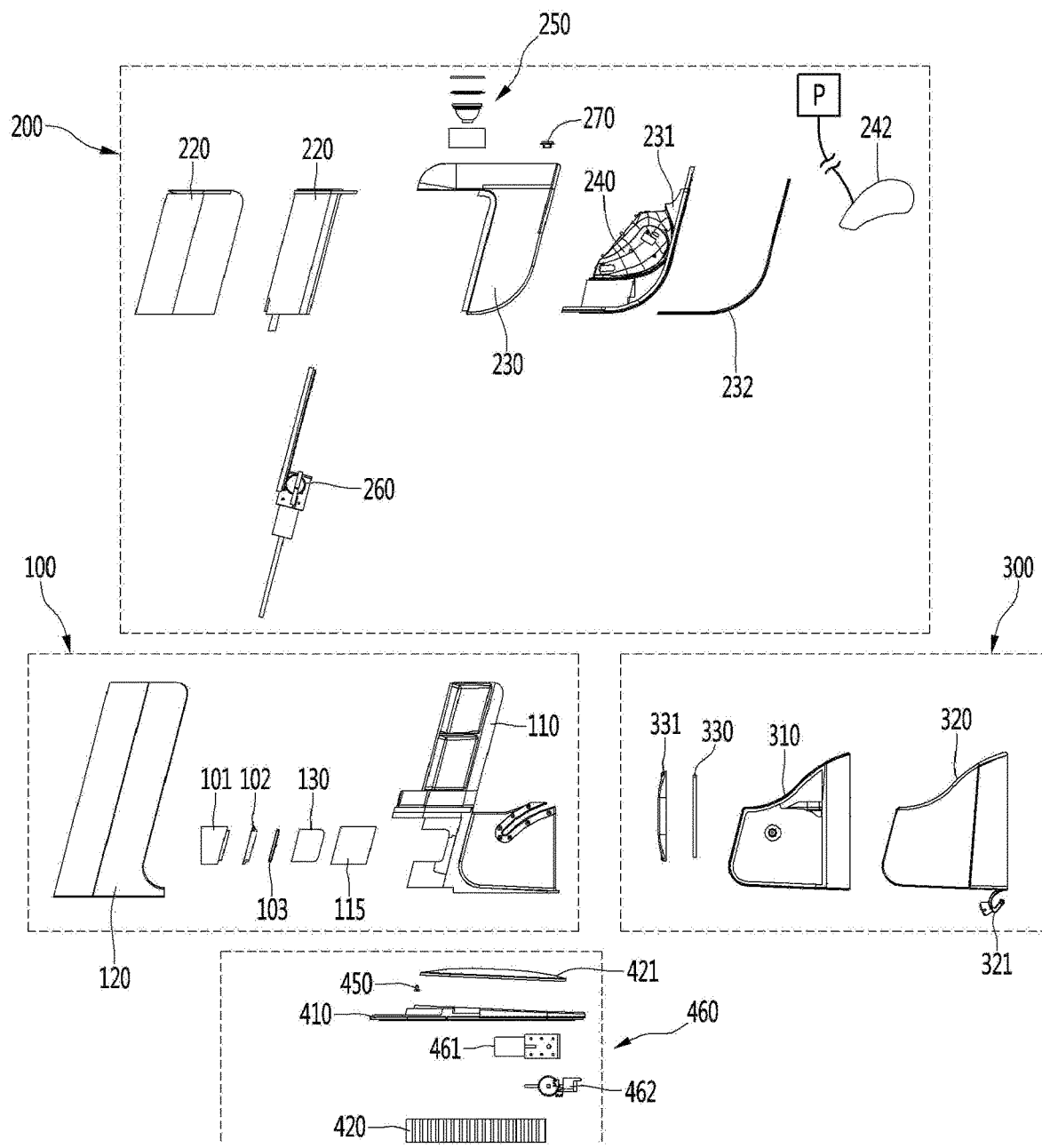
FIG. 4 is an exploded side view of the entire leg care apparatus according to an embodiment.

FIG. 4 is an exploded side view of the entire leg care apparatus according to an embodiment. Constituents of each module of the leg care apparatus according to the embodiment will be described with reference to FIG. 4.

First, the main body 100 is provided with a main frame 110 and a main body outer cover 120 provided on a rear surface of the main frame 110. A predetermined empty space may be provided between the main frame 110 and the main body outer cover 120, and components required for operating the leg care apparatus may be accommodated in the empty space.

The main body 100 may include a blower 101, a fragrance case 102 for accommodating a fragrance kit 103, and an atomizer 130. In addition, a heat generator, a radiant heater, and a cooler may be further provided.

The blower 101 is a device for generating a forced air current in the action space 500. The fragrance kit 103 may be provided as a device that provides fragrance into the action space 500 or remove a smell from the action space 500.

The atomizer 130 may supply mist to the inside of the action space 500 in at least one manner selected from ultrasonic spraying and heating spraying of water. A case in which both types of mist providing manners are installed may also be included in the embodiment.

The upper module 200 includes an upper frame 210 to which a portion of a movable member of the vertical opening device 260 is fixed to be elevated with respect to the main frame 100. An upper inner cover 230 and an upper outer cover 220 may be provided at an inner side and an outer side of the upper frame 210, respectively, to define an outer appearance of the upper module 200.

The knee care part 240, and a knee care seating panel 232 for mounting the knee care part 240 may be provided in front of the upper inner cover 230.

The side module 300 may include a side frame 310 and a side outer cover 320 provided in front of the side frame 310.

A calf thermoelectric module 330 and the calf contact pad 331 may be provided on an inner surface of the side module 300. A thermoelectric element may be provided in the calf thermoelectric module 330 to supply cold and hot air as desired by the user.

The bottom module 400 includes a bottom frame 410, a bottom housing 430 accommodating an outer edge of the bottom frame 410, and a bottom plate 440 that opens and closes a lower portion of the bottom frame 410.

A bottom supporter 441 provided as a wheel or the like is provided on a bottom surface of the bottom plate 440 so that the user easily move the leg care apparatus.

The foot thermoelectric module 420 and the foot contact pad 421 that transfers the cold and hot air of the foot thermoelectric module 420 to the user's foot in a conduction manner may be provided inside the bottom housing 430. The foot thermoelectric module 420 and the foot contact pad 421 may contact each other to transfer heat. The heat exchange fan 423, the grill 424, and the filter 425 may be further provided as constituents for the hot or cold air that is exhausted from the foot thermoelectric module 420 to the outside.

The front and rear opening device 460 may be accommodated in the bottom housing 430 so that the side module 430 rotates. The front and rear opening device 460 may be provided with a rotation driving part 461 including at least a motor and a link driving part 462 including a power transmission part such as a gear.

The bottom housing 430 is provided with a light emitting element 450 that is exposed upward so that heat is irradiated to the user's foot. In this case, the light emitting element may irradiate infrared rays. The light emitting element 450 may be provided as an ultraviolet lamp to sterilize and disinfect the action space 500.

A water tray 431 that stores water to be discharged and through which the stored waste water is removed as necessary may be further provided at one side of the bottom housing 430. Water condensed after being atomized from the atomizer 130 to perform a predetermined function may be dropped into and stored in the water tray 431.

Hereinafter, each constituent of the leg care apparatus will be described in more detail.

Figure 5:
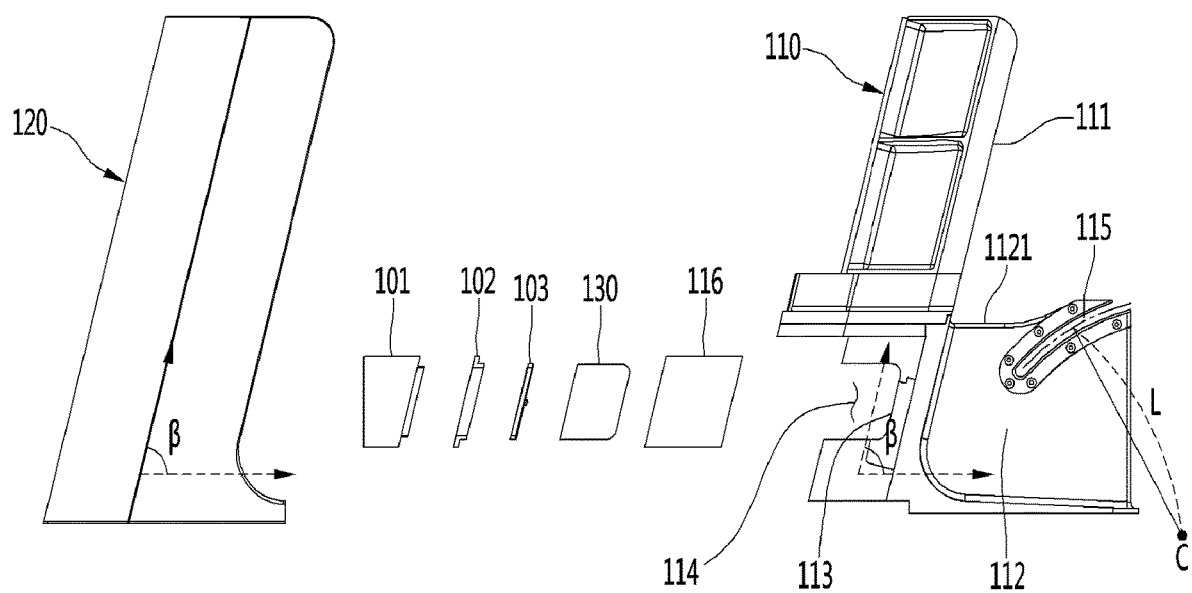
FIG. 5 is an exploded side view of a main body.

FIG. 5 is an exploded side view of the main body. A configuration and operation of the main body will be described in more detail with reference to FIGS. 4 and 5.

Referring to FIGS. 4 and 5, the main body 100 may be largely divided into a main frame 110 that defines an overall shape of the leg care apparatus and supports a load of the leg care apparatus, and a main body outer cover 120 providing a predetermined space for accommodating components between the main body outer cover 120 and the main frame 110 and disposed behind the main frame 110.

At least a portion of the upper module 200 may be inserted into an interval between the main frame 110 and the main body outer cover 120, and thus, the upper module 200 may be vertically movable in a state of being guided to the main body 100. For this, the vertical opening device 260 may be accommodated in the interval between the main frame 110 and the main body outer cover 120.

The main frame 110 may be provided with a main front and rear extension part 112 extending forward and backward from a lower portion thereof and a main vertical extension part 111 extending upward from a rear portion of the main front and rear extension part 112. The main vertical extension part 111 may extend forward in a state of being inclined at a predetermined angle β with respect to the main front and rear extension part 112. The predetermined angle may be an acute angle. Thus, the user may insert their leg into the action space 500 in a more comfortable posture and use the leg care apparatus.

The main front and rear extension part 112 may be provided to close both sides of the lower portion of the action space 500. Thus, the forced air current within the action space 500 may not be lost through both side surfaces of the action space 500.

A guide slot 115 that guides the rotation of the side module 300 may be provided in the main front and rear extension part 112. The guide slot 115 may be provided to open the main front and rear extension part 112 in a curved shape and also be provided to define a groove having a curved shape in the main front and rear extension part 112. A protrusion (see reference numeral 313 of FIG. 7) of the side module 300 may be placed to be guided within the guide slot 115.

To guide the protrusion 313, the guide slot 115 may be provided as a curve having a geometric center with respect to a predetermined rotation center point C. The guide slot 115 may be provided in a curved shape having a predetermined length L as a curvature radius at the rotational center point C. The rotation center point C may be one point of a movement support part (see reference numeral 321 of FIG. 7) of the side module 300.

The main front and rear extension part 112 is completely closed except for a region of the guide slot 115. The guide slot 115 may be completely covered by the side frame 310 of the side module 300. This is the same as a case in which the side module 330 completely rotates forward to be opened. Thus, both spaces of the action space 500 may be completely covered, and the forced air, which is artificially manipulated, in the action space 500 may leak to the outside.

For this, the side frame 310 may accommodate the main front and rear extension part 112 therein. Also, a flow blocking film 1121 that blocks the air leakage of the action space may extend up to an upper end of the main front and rear extension part 112. The flow blocking film 1121 may block the action space 500 even when the side module 300 is opened to cover the inside of the action space 500 from the outside.

An operation of the flow blocking film 1121 may be seen in FIG. 2. FIG. 2 illustrates a state in which the flow blocking film 1121 is exposed to the outside of a side portion side surface part 311 to cover the action space 500 in a state in which the side module 300 is opened.

Referring to FIG. 5, a main rear surface part 113 having a rear opening 114 may be provided on a rear surface of the main front and rear extension part 112. Components that provide various atmospheres required for the operation of the action space 500 may be mounted at a rear side of the main rear surface part 113. An operation medium that provides an atmosphere of the action space 500, such as air, light, and mist may pass through the rear surface opening 114.

The components that are placed at the rear side of the main rear surface part 113 may include the blower 101 that performs a blowing operation, the fragrance kit 103 that cleanly maintains the action space, the fragrance case 102 in which the fragrance kit 103 is accommodated, and the atomizer 130 that provides mist. Alternatively, other components may be further provided for a smooth operation of the action space 500.

The blower 101 may suction air from at least one of the inside or the outside of the action space 500 to supply the air to the action space 500. Here, the air supplied into the action space 500 may be artificially controlled in temperature. To control the temperature, the blower 101 may be provided with a separate temperature controller that is exemplified as the heat generator and the cooler.

The blower 101 may suction air within the action space 500 to apply a predetermined artificial operation to the suctioned air, thereby supplying the air into the action space 500. This may be understood as an air circulation inside the action space 500. Accordingly, energy efficiency may be improved by reducing the operation medium disposed to the outside.

An example of the fragrance kit 103 may include perfume and a photocatalyst smell decomposition device. The perfume may be a component that supplies an artificially good smell. The photocatalyst smell decomposition device is a member that is exemplified as titanium oxide and may be a device for decomposing smell particles by a catalytic action using action light such as ultraviolet light.

The atomizer 130 is a device for supplying mist. When the atomizer 130 is operated in the ultrasonic spraying manner, the mist may be supplied to the inside of the action space 500 without being hot, the legs may be cared while being cool, and the inside of the action space 500 may be cool through latent heat and the like. When the atomizer 130 is operated in the heating spray manner, the mist may be supplied to the inside of the action space 500 in a hot state, the leg may be warmed while taking the foot bath, and the inside of the action space 500 may be warmed.

The atomizer 130 may be provided with an ultrasonic spray device and a heating spray device. In this case, since the leg care apparatus is used in more various manners, the user's satisfaction may be improved.

The mist supplied from the atomizer 130 may perform a predetermined action in the action space 500.

For example, the high-temperature mist contacting the user's leg may transfer heat to the user's leg in a conduction manner. The high-temperature mist may be condensed on a surface of the user's leg and then heated by external hot air so that the foot bath is performed by continuously transferring heat to the user's leg in the conduction manner. For another example, the mist condensed on the user's leg may be evaporated to take on the cold fomentation on the user's leg.

The rear surface opening 114 may be closed by the main rear cover 116. The main rear cover 116 may be provided in a shape in which a hole is processed to allow the operation medium to pass therethrough.

The main body outer cover 120 may be provided in a shape that is inclined forward toward an upper side, like the main vertical extension part 111.

Figure 6:
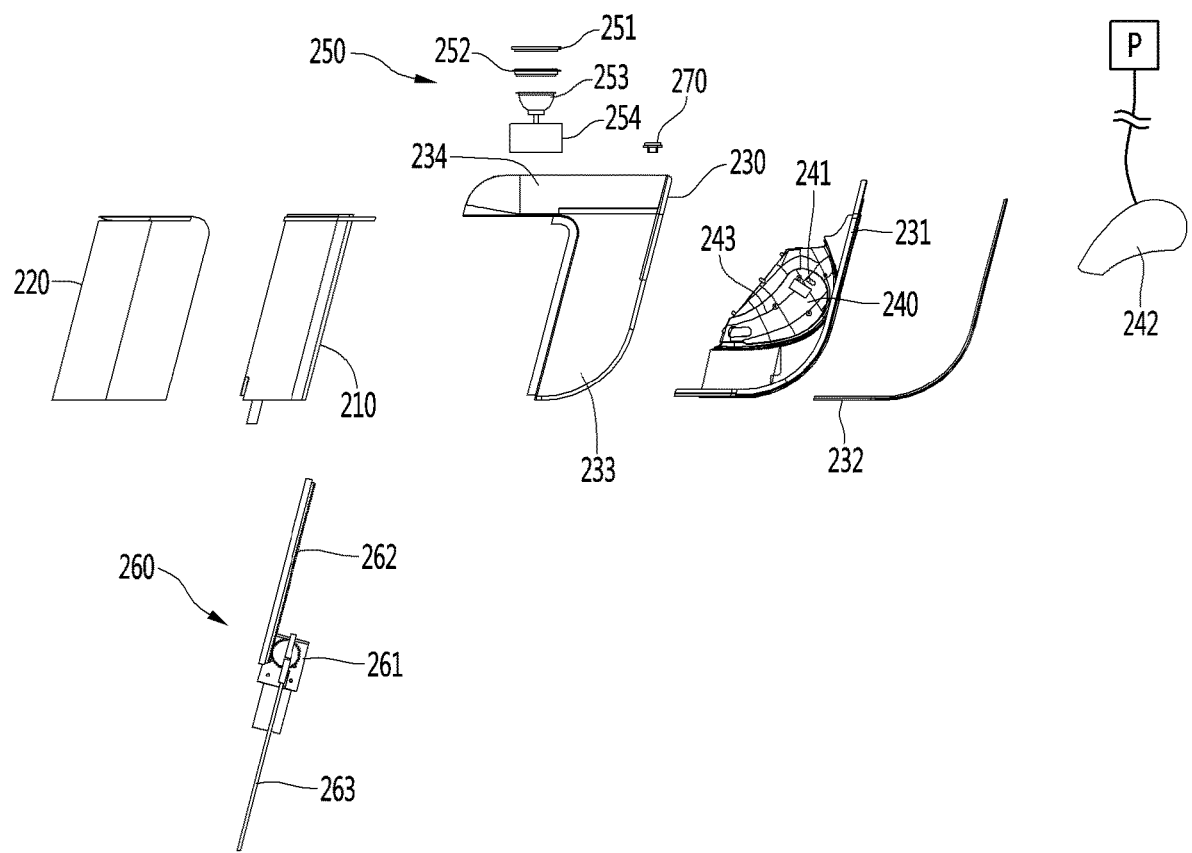
FIG. 6 is an exploded side view of an upper module.

FIG. 6 is an exploded side view of the upper module. A configuration and operation of the upper module 200 will be described in more detail with reference to FIGS. 4 and 6.

Referring to FIGS. 4 and 6, the upper module 200 may be moved upward or downward with respect to the main body 100 by the vertical opening device 260. Here, the upper frame 210 may be a component constituting a frame of the upper module 200 and extend to be obliquely inclined forward like the main frame 110.

The vertical opening device 260 may include an elevation driving part 261 including at least a motor, an upper rail 262 extending upward from the elevation driving part 261, and a lower rail 263 extending downward from the elevation driving part 261. The upper rail 262 may be coupled directly or indirectly to the upper frame 210. The lower rail 263 may be coupled directly or indirectly to the main frame 110. At least one of the upper rail 262 or the lower rail 263 may be moved to allow the upper module 200 to ascend or descend.

The upper inner cover 230 and the upper outer cover 220 may be respectively coupled to front and rear portions of the upper frame 210 to define an outer appearance of the leg care apparatus. When the upper frame 210 is moved, the upper inner cover 230 and the upper outer cover 220 may be moved together.

The upper inner cover 230 may include an upper side surface part 233 extending vertically and inclined forward and an upper portion top surface part 234 extending backward from an upper end of the upper side surface part 233 and providing an upper end surface of the leg care apparatus.

The upper portion top surface part 234 may be a surface that is mainly observed when the user uses the leg care apparatus, and thus may be used variously. For example, the upper portion top surface part 234 may be provided with a water supply device 250 that supplies water used in the atomizer 130 and a display 270 that allows the user to control the leg care apparatus.

The water supply device 250 may include a water supply frame 254 in which the supplied water is primarily stored, a water supply supporter 253 that injects water into the water supply frame 254, and a water supply seating panel 252 that supports a water supply cover 251. The user may conveniently supply water by using the water supply device 250.

The display 270 may display information that is necessary for the operation of the leg care apparatus. Manipulation information that is necessary for controlling the leg care apparatus may be inputted by using the display 270. The display 270 may be provided as a touch panel.

The knee care part 240 may be disposed on a front portion of the upper module 200 to care the user's knee. The knee care part 240 may be provided to the knee care frame 231. To allow the knee care frame 231 to be coupled to the upper inner cover 230, a knee care seating panel 232 may be further provided.

The knee care part 240 may include at least one light emitting element 241 that irradiates infrared rays to the knee, at least one massage pad 242 that presses a spaced peripheral portion of patella, and a pump P that controls air pressure to the inside of the massage pad 242. The massage pad 242 may be applied in other methods such as spring pressure control rather than the air pressure control.

The knee care part 240 may include a knee placing part 243. The at least one light emitting element 241 and the at least one massage pad 242 are placed at positions of an inner region of the knee placing part 243, respectively. The knee placing part 243 may be a structure in which a material such as a soft cushion is filled and may apply an overall pressure to the user's knee to care the knee comfortably. According to the knee placing part 243, the action due to the massage pad 242 may be more improved.

Unlike the action space 500, as described above, the knee care part 240 performs an action such as pain relief of the knee by applying pressure and heat.

Figure 7:
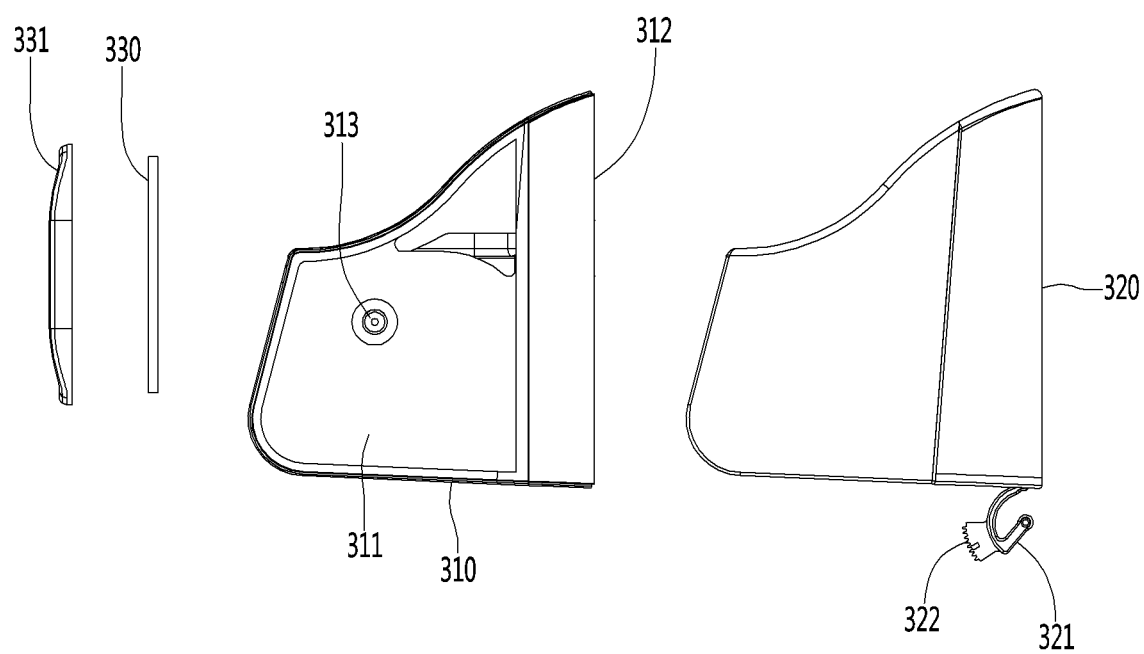
FIG. 7 is an exploded side view of a side module.

FIG. 7 is an exploded side view of the side module 300. A configuration and operation of the side module 300 will be described in more detail with reference to FIGS. 4 and 7.

Referring to FIGS. 4 and 7, the side module 300 rotates backward and forward so that the user may conveniently use the leg care apparatus.

The side module 300 may include a side frame 310 connected to the main frame 110 and a side outer cover 320 provided in front of the side frame 310.

The side frame 310 may include a side portion front surface part 312 and a side portion side surface part 311 extending backward from both sides of the side portion front surface part 312. The side portion side surface part 311 may be provided as two left and right walls, and the main front and rear extension part 112 may be inserted into an inner spaces of the two walls.

A protrusion 313 may be provided inside the side portion side surface part 311, and the protrusion 313 may be guided by the guide slot 115 (see FIG. 5). The positions at which the protrusion 313 and the guide slot 115 are provided may be opposite to each other. However, for stable operation, it is preferable that the protrusion 313 is provided on the side module 300, the guide slot 115 is provided on the main body 100.

A movement support part 321 supporting the rotation operation of the side module 300 may be provided on a lower portion of a front end of the side outer cover 320. The movement support part 321 may be hung and supported at any point of the bottom module 400 or the main body 100. The movement support part 321 may act as a center point of relative rotation with respect to the main body 100 of the side module 300.

Figure 8:
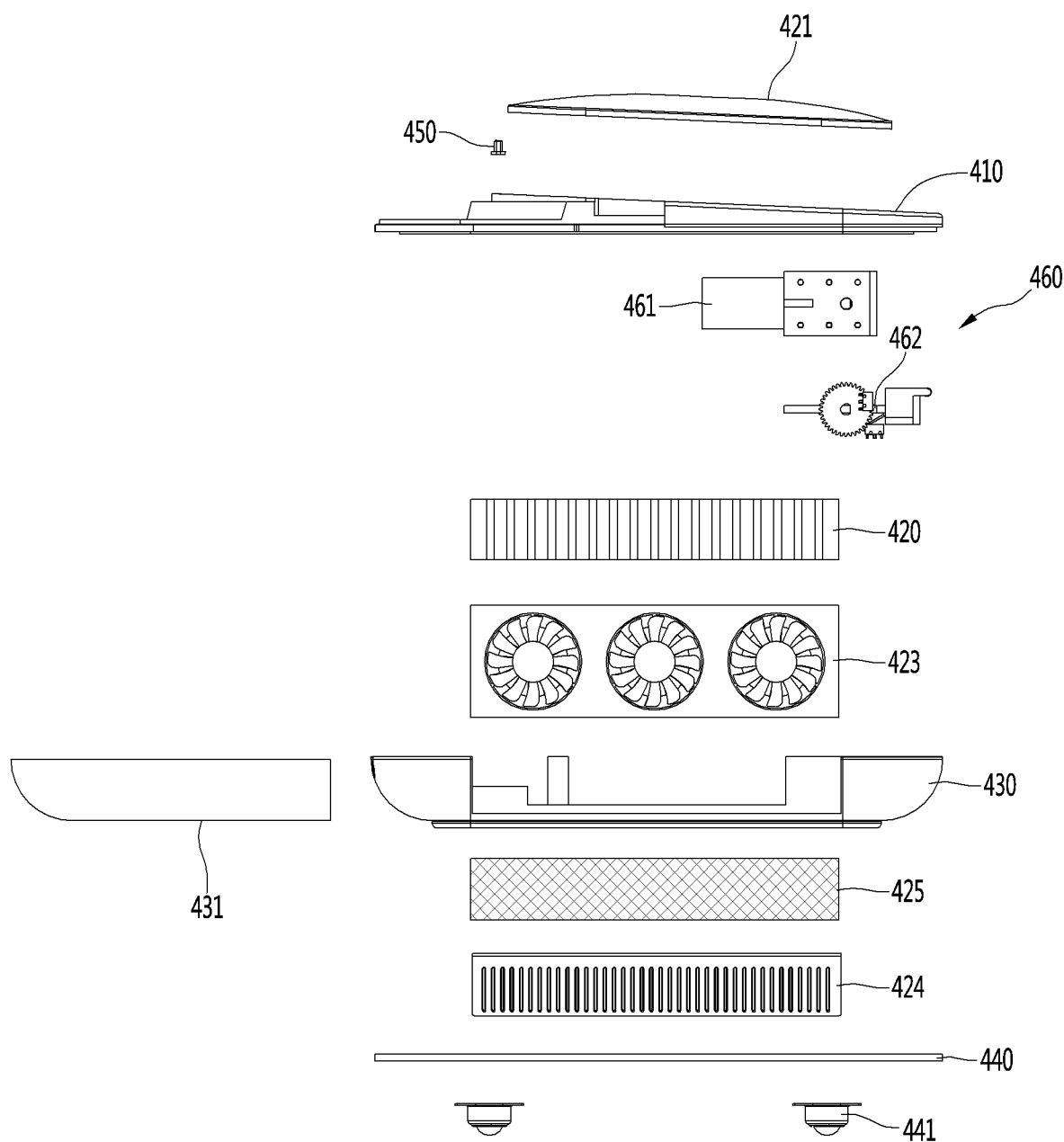
FIG. 8 is an exploded side view of a bottom module.

A movement contact part 322 is provided at an adjacent position of the movement support part 321 to receive driving force of the link driving part 462 (see FIG. 8). For example, the link driving part 462 and the movement contact part 322 may be engaged with each other to receive the driving force of the rotation driving part 461.

An interaction between the main body 100 and the side module 300 may be performed by the rotation operation through the transmission of the driving force of the front and rear opening device 460 and the guiding action of the protrusion 313 and the guide slot 115.

The rotation driving force may be transmitted from the bottom module 400 to the side module 300 by the action connected to the rotation driving part 461, the link driving part 462, and the movement contact part 322 in time series. Here, the side module 300 may rotate in a state of being supported by the movement support part 321.

When the side module 300 is rotated by the rotation driving force, the protrusion 313 of the side module 300 may be guided by being placed inside the guide slot 115. The side module 300 may rotate at a curvature radius by a correct rotation center by the mutual guiding action of the guide slot 115 and the protrusion 313.

A calf thermoelectric module 330 and the calf contact pad 331 may be provided on an inner surface of the side module 300. A thermoelectric element may be provided in the calf thermoelectric module 330 to supply cold and hot air as desired by the user. Accordingly, the foot bath function for the calf portion of the user may be performed.

When the calf thermoelectric module 330 has a large heat load, a separate heat exchange fan may be installed like the foot thermoelectric module 420.

FIG. 8 is an exploded side view of the bottom module 400. A configuration and operation of the bottom module 400 will be described in more detail with reference to FIGS. 4 and 8.

Referring to FIGS. 4 and 8, a plurality of components for the foot bath may be provided in the bottom module 400. The bottom module 400 includes a bottom frame 410, a bottom housing 430 accommodating an outer edge of the bottom frame 410, and a bottom plate 440 that opens and closes a lower portion of the bottom frame 410.

The foot thermoelectric module 420 and the foot contact pad 421 that transfers the cold and hot air of the foot thermoelectric module 420 to the user's foot in the conduction manner may be provided inside the bottom housing 430. The foot thermoelectric module 420 and the foot contact pad 421 may contact each other to transfer heat. The foot contact pad 421 may contact the sole of the user, and the hot or cold air may be transferred to the sole of the foot to perform the foot bath function.

The foot contact pad 421 may be made of a metal having high thermal conductivity, for example, copper or stainless steel so as to uniformly transfer heat to the entire sole of the foot. This may be equally applied to the calf contact pad 331.

When water having a predetermined level is accumulated in the bottom housing 430, the foot contact pad 421 may heat the accumulated water to perform the foot bath function for the foot.

The heat exchange fan 423, the grill 424, and the filter 425 may be further provided as constituents for the hot or cold air that is exhausted from the foot thermoelectric module 420 to the outside. High energy may be supplied to the foot thermoelectric module 420 to supply a large amount of hot or cold air when compared to the calf thermoelectric module 330. Heat generated in and exhausted from the thermoelectric module 420 may be smoothly discharged to the outside by the heat exchange fan 423.

To allow the air circulated to the heat exchange fan 423 to perform a cooling operation without any problem, the grill 424 and the filter 425 may be provided. The air in which foreign substances are filtered by the filter 425 may be supplied to the blower 101 and supplied to the action space 500. In this case, cleaner air may be supplied to the action space 500 to improve the user's satisfaction.

The front and rear opening devices 460 are accommodated in the bottom housing 430 to allow the side module 430 to rotate as described above. A large portion of the front and rear opening device 460 is accommodated in the bottom module 400, but is not limited thereto. For example, the front and rear opening device 460 may be provided in the main body 100.

The bottom housing 430 is provided with a light emitting element 450 that is exposed upward so that heat is irradiated to the user's foot. The light emitting element 450 may perform various functions such as sterilization, ultraviolet light for photocatalytic decomposition, infrared rays, and the like depending on the irradiated light.

The water tray 431 that stores waste water to be discharged and wastes may be further provided at one side of the bottom housing 430. In the water tray 431, water condensed after being atomized by the atomizer 130 may be dropped into and stored. The water tray 431 is provided as a component that is slid to be separated to the outside. A valve may be provided in a flow path through which water flows into the water tray 431 to prevent the water from leaking during the foot bath.

A bottom supporter 441 provided as a wheel or the like is provided on a bottom surface of the bottom plate 440 so that the user easily move the leg care apparatus. The bottom supporter 441 is provided as a rotatable wheel so that the user conveniently moves and uses the leg care apparatus in various directions. In the case of the elderly, the advantages of the above-described moving device may be largely utilized.

In the leg care apparatus according to an embodiment, an inlet 510 may be automatically opened and closed. Thus, the inlet 510 may be opened for user access to the leg care apparatus, and thus, the user may conveniently insert their leg into the action space 500. After the user inserts their leg into the action space 500, the inlet 510 may be automatically closed, such that the upper module 200 and the side module 300 may be adjusted to fit the user's leg.

Figure 9:
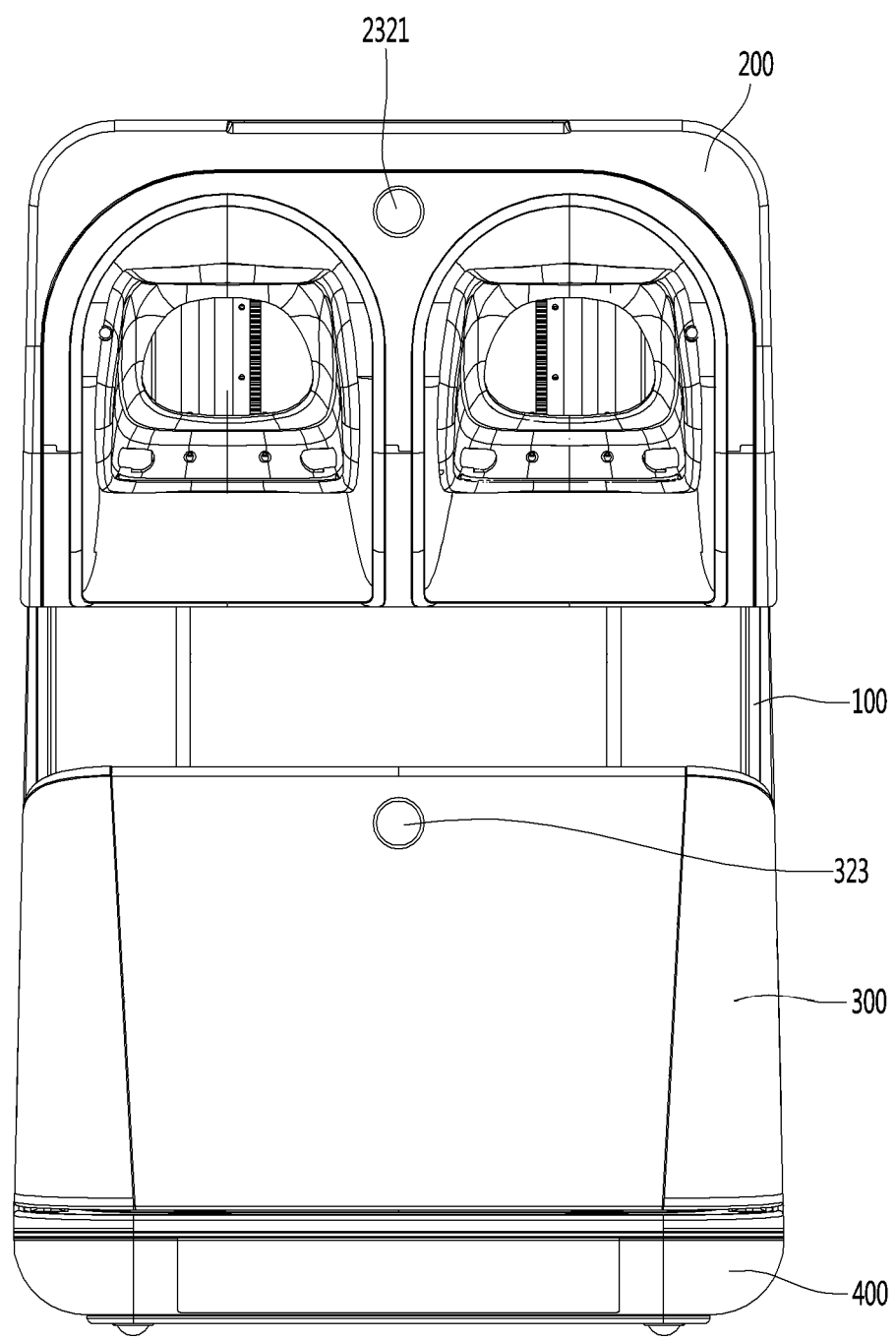
Figure 10:
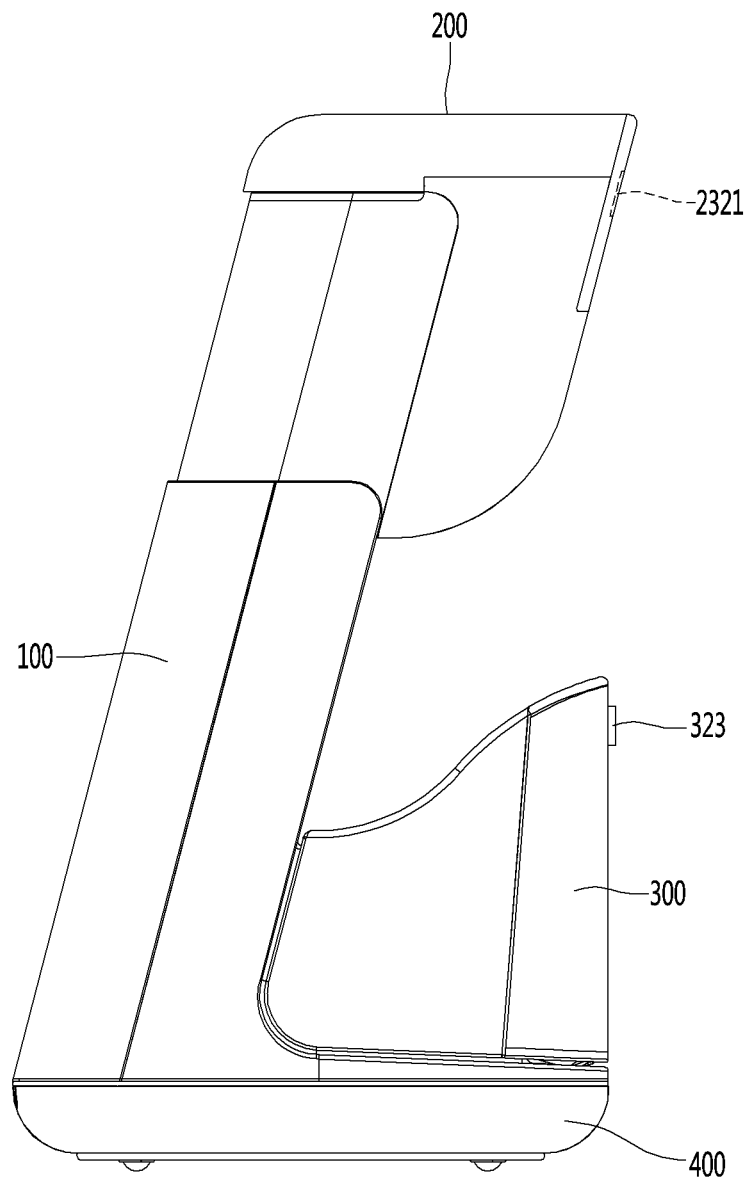

FIGS. 9 and 10 are views of a proximity sensor that senses the user in the leg care apparatus according to an embodiment, wherein FIG. 9 is a front view, and FIG. 10 is a side view.

Referring to FIGS. 9 and 10, the side module 300 may be provided with a first proximity sensor 323. The first proximity sensor 323 may sense that the user is accessing the front side of the leg care apparatus. The first proximity sensor 323 may sense the user by transmitting and receiving a sensing signal from the front side. At least one of the side module 300 or the upper module 200 may be operated to open the inlet 510 after the sensed state of the user is maintained for a predetermined time or immediately after the user is sensed by the first proximity sensor 323.

According to the first proximity sensor 323, the inlet 510 may be opened to allow the user's leg to be inserted into the action space 500 through the user's access so as to use the leg care apparatus. The user themselves may prepare for the use of the leg care apparatus for access to the leg care apparatus without having to lift or move any part of the leg care apparatus.

The upper module 200 may be provided with a second proximity sensor 2321. The second proximity sensor 2321 may sense that the user's leg is being inserted into the action space 500. The second proximity sensor 2321 may transmit a sensing signal to a lower side facing the action space 500 to sense the user's leg. The second proximity sensor 2321 may transmit a sensing signal toward the front side of the user to sense the abdomen of the user in the state in which the leg is being inserted into the action space 500. It may be possible to transmit the sensing signal forward that is inclined downward.

When the sensing state of the user is maintained by the second proximity sensor 2321 for a predetermined time, the side module 300 and the upper module 200 may be operated to close the inlet 510. When the sensing state of the user is maintained by the second proximity sensor 2321 for a predetermined time, the user may be waiting for their leg to be properly inserted into the action space, and thus the preparation for using the leg care apparatus may be completed.

The vertical opening device 260 and the front and rear opening device 460 may be operated by using the sensing signal of the second proximity sensor 2321 as a trigger signal. After or during the vertical opening device 260 and the front and rear opening device 460 being moved by a predetermined distance in a direction of closing the inlet 510, a portion of the user's body may contact one of the side module 300 and the upper module 200. Here, the movement of the side module 300 or the upper module 200 may be stopped.

The contacting of a portion of the user's body with at least one of the side module 300 or the upper module 200 may be sensed through an electromotive force that is generated in the driving motor of the vertical opening device 260 and the front and rear opening device 460. Alternatively, it may be sensed by installing an encoder to sense that the side module 300 or the upper module 200 is not moving for a predetermined time. In order not to apply excessive force to the leg of the user, the driving motor of the vertical opening device 260 and the front and rear opening device 460 may have relatively weak driving force.

Alternatively, it may be also possible to provide a separate electrostatic sensing part, or a separate mechanical sensing part for sensing a contact of each module with the body of a user. As another method, a representative value of the user's body may be stored in a memory (see FIG. 11) of the leg care apparatus, and the side module 300 and the upper module 200 may be closed up to a position corresponding to the representative value by using the sensing signal of the second proximity sensor 2321 as a start signal.

Thereafter, the side module 300 and the upper module 200 may be moved to a state that is suitable for the user's body by performing fine adjustment. The fine adjustment may be performed by manipulating the display 270 by the user. For example, the user may further move the upper module 200 downward by manipulating the display 270 provided as a touch panel. Here, the user may move their knee until it is in contact with the knee placing part 243 to improve the satisfaction of the user.

The fine adjustment may be similarly performed for the side module 300. For example, the side module 300 may rotate backward until the calf contact pad 331 widely surface-contacts the calf of the user.

Figure 11:
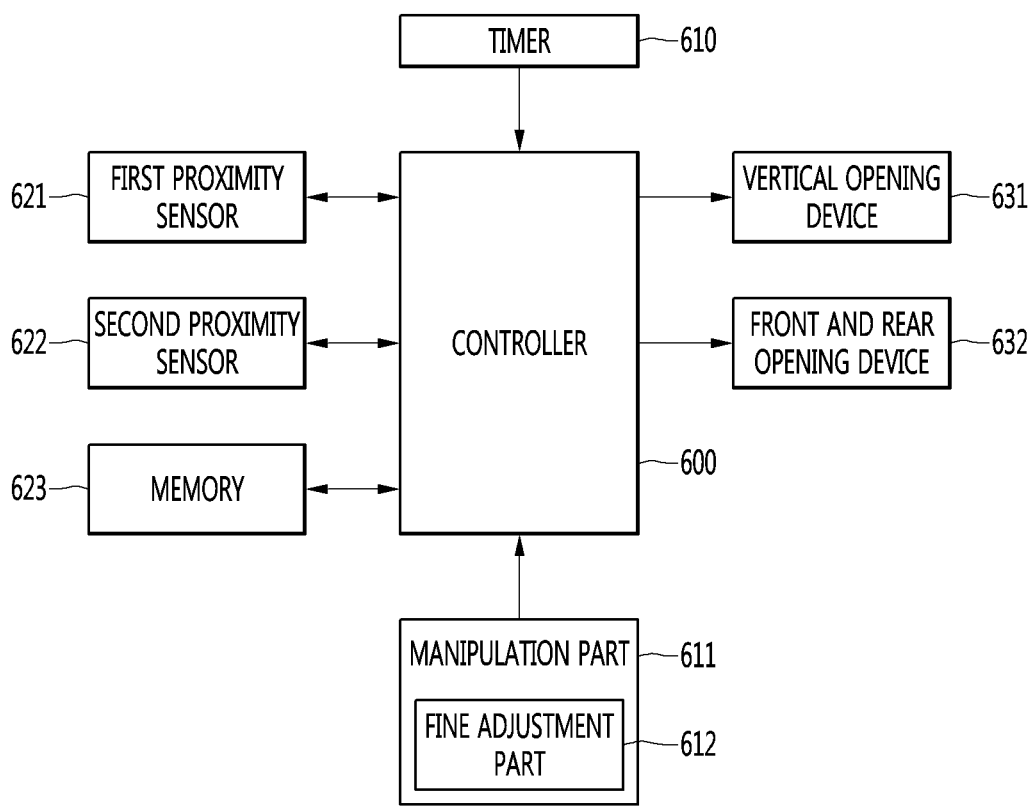
FIG. 11 is an electrical schematic diagram of the leg care apparatus used to explain an automatic switching operation for opening and closing an inlet.

FIG. 11 is an electrical schematic diagram of the leg care apparatus used to explain an automatic switching operation for opening and closing the inlet. For ease of understanding, the reference numerals in FIG. 11 may be different from the reference numerals used in the previous drawings. For example, in the previous description, the vertical opening device is denoted by reference numeral 260, but are denoted by reference numeral 631 in FIG. 11. However, the same name may be used for the same or similar configuration.

Referring to FIG. 11, the leg care apparatus may be operated under the control of a controller 600 which controls an operation as a whole.

The controller 600 receives signals from a first proximity sensor 621 that is disposed outside the leg care apparatus to sense user's access so as to use the leg care apparatus and a second proximity sensor 622 that senses normal insertion of the user's leg into the leg care apparatus, i.e., the action space, thereby generating a predetermined control signal.

The controller 600 operates the vertical opening device 631 and the front and rear opening device 632 to open the inlet 510 according to the sensing signal from the first proximity sensor 621. The vertical opening device 631 and the front and rear opening device 632 may open in different directions to widen the inlet 510. Accordingly, the inlet 510 may be opened so that the user may conveniently insert their leg into the action space.

Here, a timer 610 may be operated to open the opening devices 631 and 632 after a predetermined time elapses, and not immediately after the first proximity sensor 621 senses the user. After the first proximity sensor 621 senses the user, the opening devices 631 and 632 are operated after a predetermined time elapses, thereby preventing an unnecessary operation of the opening device. However, the opening devices 631 and 632 may not be opened immediately after the first proximity sensor 621 senses the user.

The proper positioning of the user's leg in the action space 500 may be sensed by the second proximity sensor 622. In detail, the second proximity sensor 622 may determine that the user is in the correct position based on the user waiting without moving for a predetermined time. The time period for which the user is waiting may be counted by the timer 510.

When it is determined that the user has positioned themselves at the correct position, the controller 600 may operate the opening devices 631 and 632 to automatically close the inlet 510. When the opening devices 631 and 632 are closed by a certain degree, the closing operation may be stopped automatically. As described above, the operation stop of the opening devices 631 and 632 may be performed by counter electromotive force of the motor, a predetermined representative value, or the user being sensed by the sensor.

Thereafter, the user may manipulate the fine adjustment part 612 of a manipulation part 611 to adjust the upper module 200 and the side module 300 to fit the user's leg. As the upper module 200 and the side module 300 are adjusted, it is possible to finely adjust the position of each module to fit the user's preference to the position that is optimal for the user's leg. According to this embodiment, the user's injury due to excessive automatic adjustment may be prevented, and each module may be placed at a position that matches user's body to perform a foot bath suitable for the user.

The memory 623 may store various information necessary for the operation of the leg care apparatus in advance. The memory 623 may store user's selections in a nonvolatile memory.

Figure 12:
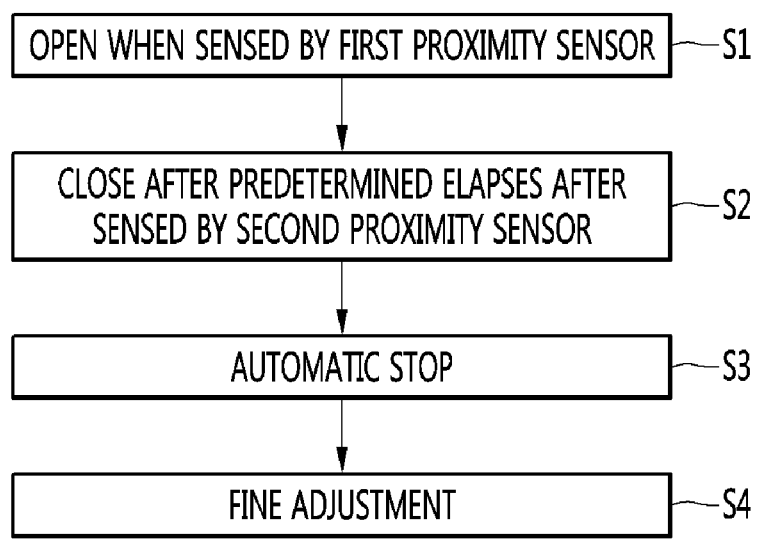
FIG. 12 is a flowchart for explaining a method for controlling the leg care apparatus.

FIG. 12 is a flowchart for explaining a method for controlling the leg care apparatus. In FIG. 12, a configuration and operation, which are capable of being applied as is, are applied as is, and only contents of the method for controlling the leg care apparatus will be described.

First, when the fact that the user is accessing the leg care apparatus is sensed by the first proximity sensor 621, the inlet 510 into which the user's leg is inserted into the action space is opened (S1).

Thereafter, the second proximity sensor 622 may sense that the user has positioned themselves at the correct position by inserting their leg through the inlet 510. The proper position of the user sensed by the second proximity sensor 622 may be determined by reading the same sensing signal for a predetermined time. During this time, the user may move to a more comfortable position. After the user has settled to a comfortable position through the above process, at least one of the vertical opening device 631 or the front and rear opening device 632 may be operated in the direction of closing the inlet 510 (S2).

While the opening devices 631 and 632 are being closed, when it is determined that the opening devices are no longer automatically closing due to factors such as generation of the counter electromotive force of the motor to a certain level or more, the automatic closing of the opening devices may be stopped (S3).

Thereafter, it is possible to position each module of the leg care apparatus in an optimal state through the fine adjustment (S4). The fine adjustment may be performed by the user. Alternatively, a number of sensors may be used to suggest a suitable location for the user.

Finally, as the foot bath is performed, the control method according to an embodiment may be terminated.

In case of the elderly, the cognitive ability may be degraded. For this reason, even if the same leg care apparatus is used, there is high possibility of collision or the like with a member of the leg care apparatus that operates during the automatic operation of the apparatus. For example, while the leg care apparatus is operating, when the side module 300, which is an automatically operated member, is opened, the user's body may collide with the side module 300, and thus be injured. The elderly may have injuries, such as a fracture, even if small collision is applied to the body. Particularly, in recent years, in the case of increasing gout patients, when the foot collides with the side module 300, a great pain may occur.

Hereinafter, another embodiment for protecting the user's body is proposed. In the following embodiments, the second proximity sensor is proposed in a specific configuration to accurately sense the user by using the second proximity sensor, realize the user by sensing of the second proximity sensor, and link to the operations of the side module 300 and the upper module 200.

First, a configuration of the second proximity sensor will be described in detail.

Figure 13:
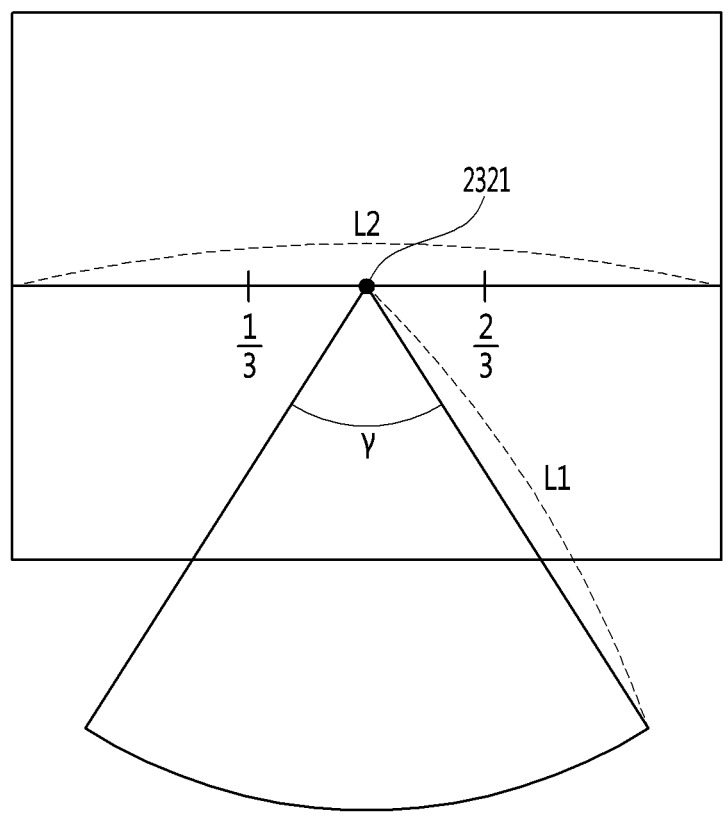
FIG. 13 is a view illustrating a state in which a second proximity sensor is operated.

FIG. 13 is a view illustrating a state in which the second proximity sensor is operated.

Referring to FIG. 13, the second proximity sensor 2321 is provided on an upper portion of the leg care apparatus. The second proximity sensor 2321 may sense the user by transmitting a sensing signal forward or downward. The proximity sensor 323 may apply ultrasonic and/or optics to sense the user by sensing a signal reflected from the user near a predetermined distance. When the second proximity sensor 2321 transmits the sensing signal forward, the abdomen of the user may be sensed, and when the second proximity sensor transmits the sensing signal downward, the thigh of the user may be sensed. The second proximity sensor 2321 may also sense the abdomen and thigh by transmitting the sensing signal to be inclined obliquely downward.

The second proximity sensor may be placed at an approximately center portion of the front surface of the upper module 200. The second proximity sensor may be provided within a range of one-third of the center with respect to a left and right length L2 of the upper module 200.

The second proximity sensor may have a sensing range in a three-dimensional cone shape. In the cone shape, when the second proximity sensor is defined as a center, a forward sensing angle γ may be about 120 degrees, and a sensing distance L1 may be about 60 centimeters.

Accordingly, obstacles disposed at both sides of the upper module 300 outside the cone shaped sensing range may not be sensed. For example, it is possible to prevent the user's arm or other object around the periphery from being sensed by the second proximity sensor 2321.

Hereinafter, the linkage operation of the second proximity sensor, the side module, and the upper module will be described.

Figure 14:
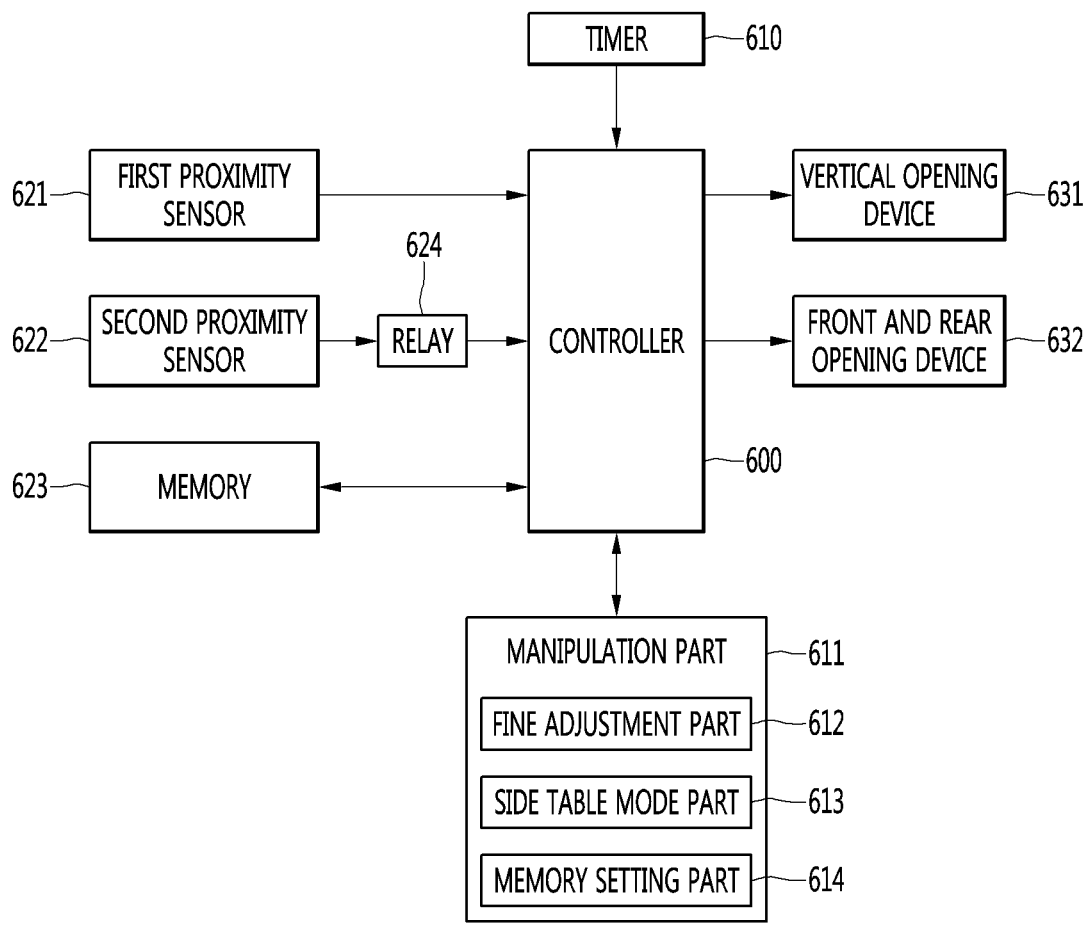
FIG. 14 is an electrical schematic diagram of a leg care apparatus according to another embodiment.

FIG. 14 is an electrical schematic diagram of a leg care apparatus according to another embodiment. FIG. 14 is characterized in that other components are added to the configuration of the leg care apparatus of FIG. 11. Therefore, the description of FIG. 11 is applied as is without specific description.

Referring to FIG. 14, a relay 624 is further provided between the second proximity sensor 622 and the controller 600. The relay 624 may delay the signal transmission by waiting for a predetermined time, for example, at least 2 seconds or more, to transmit the sensing signal sensed by the second proximity sensor 622 to the controller 600. That is to say, the sensing signal may be transmitted to the controller 600 when the same user sensing signal continues from the second proximity sensor 622 for 2 seconds or more. Here, the controller 600 may close the inlet 510 by operating the upper module 200 and the side module 300.

The user of which their leg is inserted into the action space may be sitting on a chair in close proximity to the leg care apparatus. Here, the user may adjust the chair and their legs together and adjust their posture to a comfortable and correct position. For example, the user may move their legs or move the chair. It may take time for the user to settle to a comfortable posture desired by the user and to correctly locate their leg in the action space inside the leg care apparatus.

For this, even if the user's access to the leg care apparatus is sensed, when the sensing signal of the second proximity sensor 622 is delayed for a predetermined time to be transmitted to the controller, the user may correctly adjust their posture during the waiting time. In addition, the user may prepare movement of sitting on the chair at the correct position during the waiting time. The delay operation may be understood as waiting for a sufficient time in consideration of the fact that cognitive ability and exercise ability may be degraded in the elderly.

The relay 624 may be more preferably provided to obtain the accuracy and reliability of the delay operation even when the timer 610 is separately provided.

When the user is closer to the second proximity sensor 622 by a predetermined level or more, the automatic closing operation of the upper module 200 and the side module 300 may be terminated, and fine adjustment may be performed. The fine adjustment may be performed based on the user by using user's tactile touch between the user's body and each module of the leg care apparatus. Accordingly, the satisfaction of the user may be enhanced.

The proximity between the second proximity sensor 622 and the user may be applied to a method applied to the first proximity sensor and may be determined by a distance between the user and the second proximity sensor 622, which is identified by the second proximity sensor 622.

The manipulation part 611 may include the fine adjustment part 612 as described above, a table mode part 613 for operating the leg care apparatus as a side table, and a memory setting part 614 that is capable of adjusting an action space adjustment module in a state desired by the user.

In the leg care apparatus of the embodiment, a size of the action space may be adjusted using the action space adjustment module as described above. The user may use the leg care apparatus as a side table by adjusting a height of the top surface of the upper module together with the adjustment of the inner action space of the leg care apparatus through the action space adjustment module. The side table may be a small table on which a clock or the like may be placed.

Specifically, the leg care apparatus may be used in various manners depending on the height of the upper module 200. First, a state in which the upper module 200 is placed at the lowest position may be used as a storage mode in which the leg care apparatus is stored because the leg care apparatus is decreased in size. Second, a state in which the upper module is placed at the highest position may be used as a side table mode in which the user places things on the leg care apparatus. Third, a middle height between the highest height and the lowest height may be used as a foot bath mode in which the user inserts their leg into the action space to perform the foot bath.

The use state of the side table mode may preferably exemplify the highest state of the upper module 200, but is not limited thereto, and may be any height suitable for the user in a state in which the height of the upper module 200 is adjusted. In any case, however, the side module may be in a folded state without being opened. That is to say, the side table mode may be implemented in a state in which only the upper module 200 is placed at a predetermined height while the side module 300 is closed. Alternatively, the side module may not be completely closed from an industrial level.

The side table mode may be performed by operating a button of the side table mode part 613. When the button of the side table mode part 613 is pressed, the upper module 200 is moved to a preset height, and the side module 300 may be maintained in a closed state.

The memory setting part 614 may be used for remembering the state of each module of which the height is adjusted to fit the user into the memory 623.

For example, to implement the side table mode, the upper module 200 may be adjusted as a side table having a height suitable for the user, and then, the memory setting part 614 may be manipulated. The height of the manipulated upper module 200 may be remembered as a height corresponding to the side table mode. Here, the side module 300 may be maintained in the closed state, and also, the side module 300 may be closed by the fine adjustment part 612 in advance.

The present state of each module stored by the memory setting part 614 may be remembered by an encoder provided in the vertical opening device 631 and the front and rear opening device 632. For example, a moving amount of each of the opening devices 631 and 632 moved by the encoder from the initial position of each module may be stored in the memory 623. Of course, other methods are possible.

After the height of the side table mode is remembered, when the user wants to use the leg care apparatus in the side table mode, the user may operate the side table mode part 613. According to the manipulation, the upper module 200 may adjust to a height designated by the user, and the side module 300 may be maintained in the closed state.

The memory setting part 614 may be used not only in the height memory of the upper module 200 but also in memory of other modes in the side table mode part 613. For example, the fine adjustment state for the foot bath by the fine adjustment part 612, i.e., a state, in which the user finely adjusts to fit their body, may be stored in the memory 623 through the memory setting part 614. Even in this case, after storing in the memory 623, each module may be finely adjusted in a remembered state by operating the fine adjustment part 612.

The manipulation of an object to be remembered in the memory setting part 614 and the memory setting part 614 may be performed by various manners such as the number of times of pressing the memory setting part 614, a simultaneous operation of other buttons and the memory setting part 614, and manipulation of the memory setting part 614 after pressing other buttons. However, it is easily understood that the present state of each module is stored.

The operations of other configurations may be applied as described above.

Figure 15:
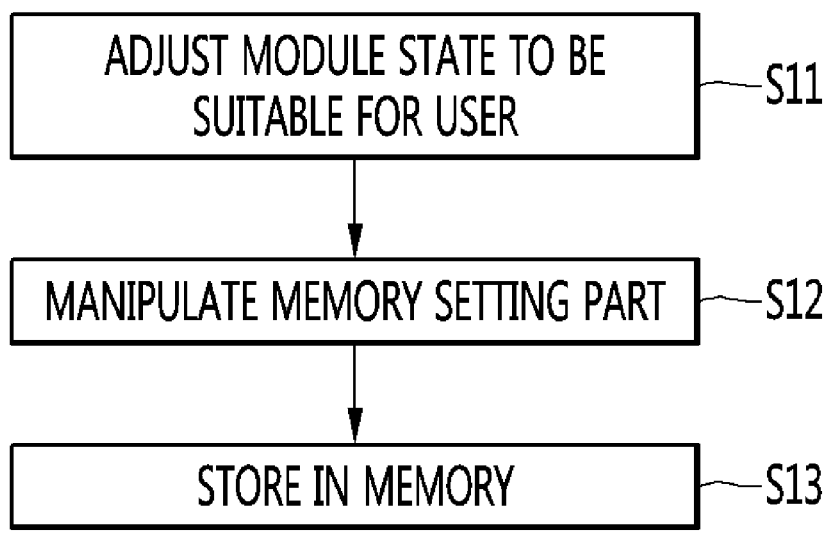
FIG. 15 is a flowchart for explaining a method for controlling a leg care apparatus according to another embodiment.

FIG. 15 is a flowchart for explaining a method for controlling a leg care apparatus according to another embodiment. In this control method, the description that is already given may be applied, and in the following description, only characteristic portions of this control method will be described.

Referring to FIG. 15, first, a user may adjust each of modules of a leg care apparatus to a desired position and state (S11). For example, to store a foot bath mode, an upper module 200 and a side module 300 may be disposed in a state in which automatic adjustment and fine adjustment are completed as desired by the user.

Thereafter, the user may operate the memory setting part 614 to store the location of each module (S12). The stored location may be stored in the memory 623 for each mode (S13).

Thereafter, in response to the button manipulation of each mode of the user, each module may be quickly moved to each position for each mode. As described above, the mode may include a storage mode, a side table mode, and a foot bath mode.

Figure 16:
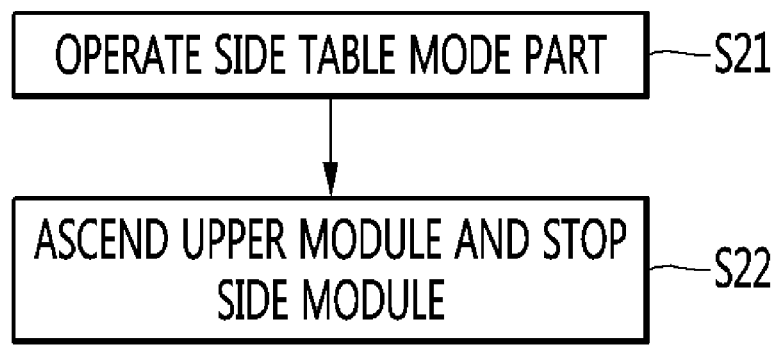
FIG. 16 is a flowchart for explaining a method for controlling a leg care apparatus according to another embodiment.

FIG. 16 is a flowchart for explaining a method for controlling the leg care apparatus according to another embodiment. In this control method, the description that is already given may be applied, and in the following description, only characteristic portions of this control method will be described.

Referring to FIG. 16, first, when a user operates the side table mode part 614, it is determined that the user is using the leg care apparatus as a side table rather than a foot bath mode (S21).

Subsequently, the vertical opening device 631 and the front and rear opening device 632 may be operated by reading information in the memory 623 under the control of the controller (S22). If the storage mode has been previously performed, the upper module 200 may ascend, and the side module 300 may be stopped. If a height of the upper module 200 corresponding to the side table mode is stored in advance by the storage setting part 614 or the like, the upper module 200 may ascend up to the stored height.

Hereinafter, an embodiment of the mechanical configuration of the leg care apparatus that is capable of being used by the user more conveniently in the side table mode will be described in detail.

In the leg care apparatus according to the embodiment, the upper module 200 of which a height is adjustable is provided. A top surface part of the upper module 200 may have an upper portion top surface part 234 having a flat top surface (see FIG. 6).

The upper portion top surface part 234 is a portion to which user's eyes gaze comfortably during a foot bath. When the user is enjoying the foot bath, the eyes gaze to the upper portion top surface part 234. Here, the user may conveniently read a book placed on the top surface. In addition, when the user is not having a foot bath, the upper module 200 may be adjusted in height to be used as a small side table having a height suitable for the user.

The leg care apparatus according to an embodiment may provide a flat top surface to perform more various purposes and functions, for example, the side table. Hereinafter, various configurations provided by the leg care apparatus to faithfully perform the function of the table will be described.

Figure 17:
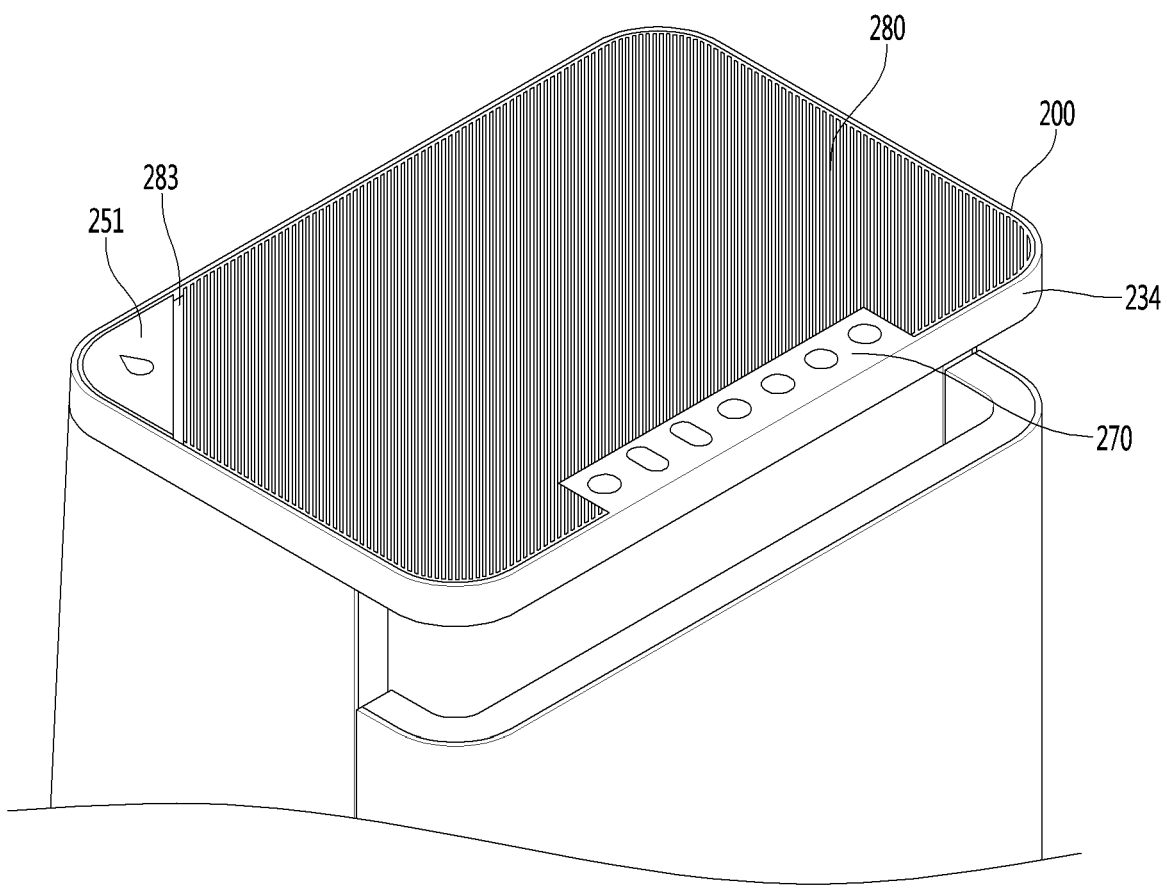
FIG. 17 is an upper perspective view of the leg care apparatus according to another embodiment.

FIG. 17 is an upper perspective view of the leg care apparatus according to another embodiment.

Referring to FIG. 17, an upper portion top surface part 234 having a flat surface is disposed on an upper end of the upper module 200. A flat upper plate 280 may be placed on the upper portion top surface part 234.

A display 270 that displays a control state of the leg care apparatus or is manipulated by the user may be provided on the upper portion top surface part. The display 270 may be a touch panel and may display a control state and/or user input.

The upper module 200 may be made of a rigid resin, and the upper plate 280 may be made of rubber having a high friction coefficient. Even if an object is placed on the upper plate 280, the original position may be maintained without slipping.

A water supply cover 251 is provided at one corner of the upper plate 280. Since the water supply cover 251 is capable of being easily lifted up, water supplied to the atomizer may be easily injected.

Figure 18:
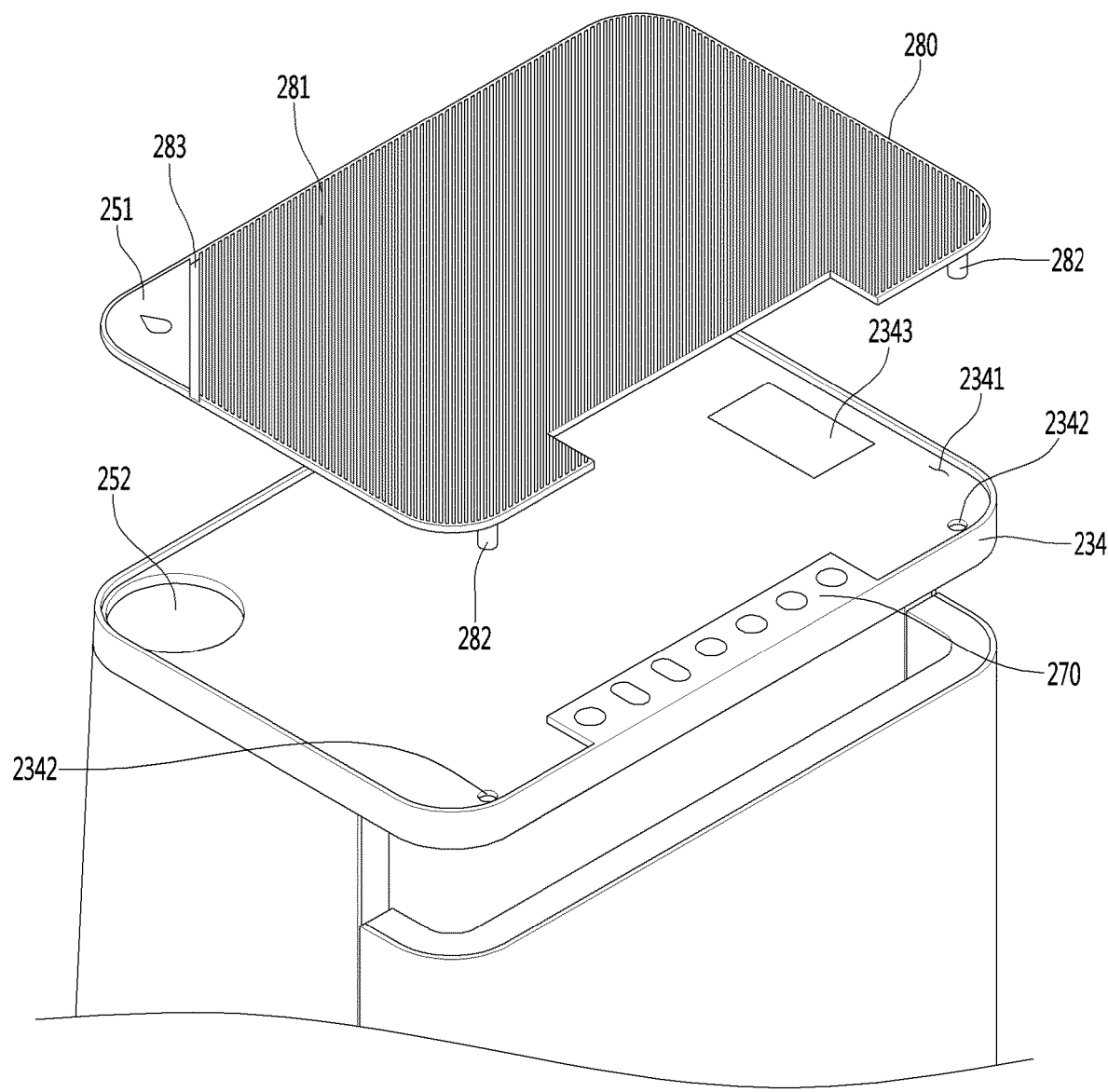
FIG. 18 is an exploded perspective view of an upper plate that is separated from an upper portion top surface part.

FIG. 18 is an exploded perspective view of the upper plate 280 that is separated from the upper portion top surface part 234.

Referring to FIG. 18, the upper plate 280 may be provided in a substantially rectangular shape and be made of soft rubber having elasticity. The water supply cover 251 is provided at one rear corner of the upper plate 280, and a recess groove 283 is defined in a boundary between the water supply cover 251 and the other portion of the upper plate 280. The water supply cover 251 is largely folded so that the water supply cover 251 may be easily lifted when compared to other portions of the upper plate 280.

The upper plate 280 is provided with a friction groove 281 that is linearly recessed to increase in friction force of a top surface of the top plate 280. A plurality of friction grooves 281 may be provided at predetermined intervals. When an object such as a book and a cup is placed on the upper plate 280, the friction groove 281 may be additionally provided in the upper plate 280 made of rubber to prevent the object from falling or slipping. Since the leg care apparatus is a free-moving article, the friction groove 281 may play a larger role.

A bottom surface of the four corners of the upper plate 280 may be provided with a fitting protrusion 282. The fitting protrusion 282 may be fitted into the fitting groove 2342 of the upper portion top surface part 234. The fitting protrusion 282 may be fitted into the fitting groove 2342, and thus, the upper plate 280 may be fixed to the upper portion top surface part 234.

An upper plate groove 2341 which is defined as an inner space of an edge protruding upward and in which the upper plate 280 is accommodated may be provided in the upper portion top surface part 234. The display 270 may be provided at the same height as the edge of the upper portion top surface part 234 to improve a sense of unity between the components.

A wireless charging part 2343 may be provided at any one side of the upper plate groove 2341. The wireless charging part 2343 may be a constituent for wirelessly charging a mobile terminal. The wireless charging part 2343 may not be disposed at a central portion of the upper plate groove 2341 but be disposed at one biased side. According to an embodiment, a main article such as a book is placed at the center of the upper plate 280, and the mobile terminal may be disposed at one corner portion so as to be used.

A water supply seating panel 252 is provided at one corner of the upper plate groove 2341 aligned with the water supply cover 251 to inject water in a state where the water supply cover 251 is opened.

In the configuration according to the embodiment, the user may use the leg care apparatus in a way such as enjoying reading during a foot bath. When the user does not have a foot bath, the leg care apparatus may be used as various purposes such as being used as the side table for reading a book, or charging a mobile terminal.

Hereinafter, another embodiment capable of preventing physical contact that may occur to the user when the side module or the upper module is operated will be described. In following embodiments, the first proximity sensor is proposed in a specific configuration to accurately sense the user by using the first proximity sensor, realize the user by sensing of the first proximity sensor, and link to the automatic operations of the side module and the upper module.

First, a configuration of the first proximity sensor will be described in detail.

Figure 19:
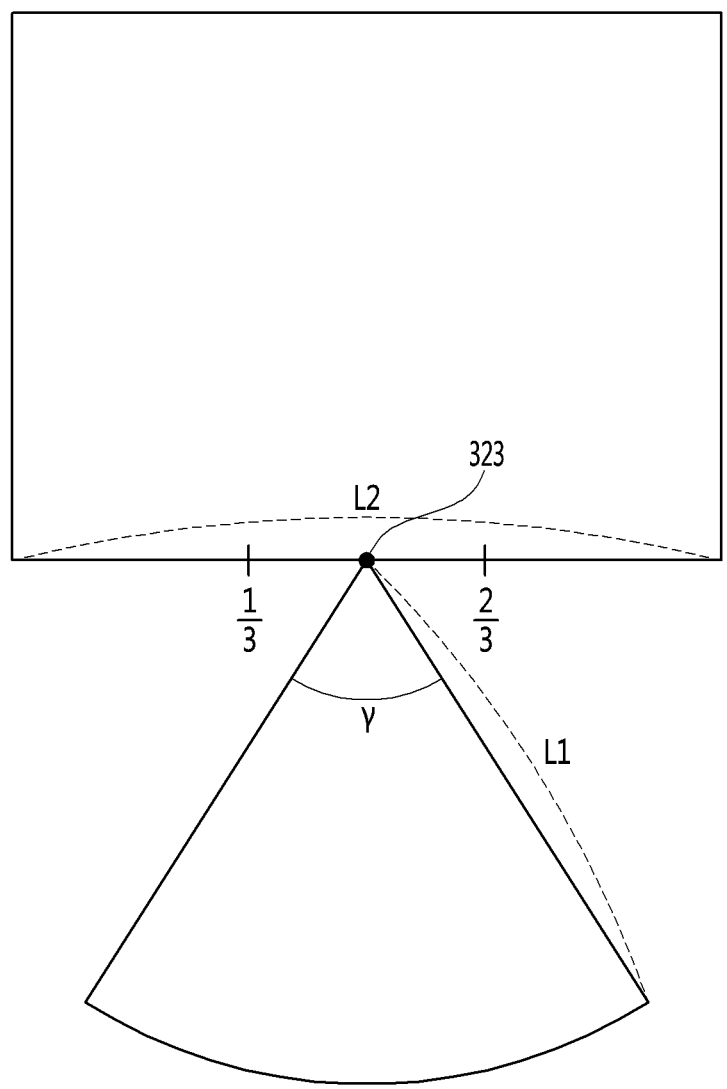
FIG. 19 is a view illustrating a state in which a first proximity sensor is operated.

FIG. 19 is a view illustrating a state in which the first proximity sensor is operated.

Referring to FIG. 19, the first proximity sensor 323 is provided on a front portion of the leg care apparatus. The proximity sensor 323 may sense the user by transmitting a sensing signal to the front side. The proximity sensor 323 may apply ultrasonic and/or optics to sense the user by sensing a signal reflected from the user near a predetermined distance.

The first proximity sensor 323 may be placed at an approximately center portion of the front surface of the side module 300. The first proximity sensor 323 may be provided within a range of one-third of the center of the side module 300 with respect to the left and right length L2.

The first proximity sensor 323 may have a sensing range having a fan shape. In the fan shape, when the first proximity sensor 323 is defined as the center, a forward sensing angle γ may be about 120 degrees, and a sensing distance L1 may be about 60 centimeters.

Accordingly, the user who is disposed to be biased on both sides of the side module 300 or accesses both the sides of the side module 300 is not sensed. Accordingly, when the user's foot is excessively placed on both the sides of the side module 300, the side module 300 may be prevented from being operated to collide with the user's foot.

If the user is not within a predetermined sensing distance L1 to use the side module 300, the user is not sensed. Accordingly, it may response to the user having accurate intention to use the leg care apparatus, thereby preventing unnecessary operation of the leg care apparatus. Also, an unnecessary starting operation of the leg care apparatus may be prevented.

According to the first proximity sensor 323, the side module 300 does not move when there is a user passing by the side of the leg care apparatus. Accordingly, the user's foot may be previously prevented from colliding with the side module 300.

Hereinafter, the linkage operation of the first proximity sensor 323, the side module 300, and the upper module 200 will be described.

Figure 20:
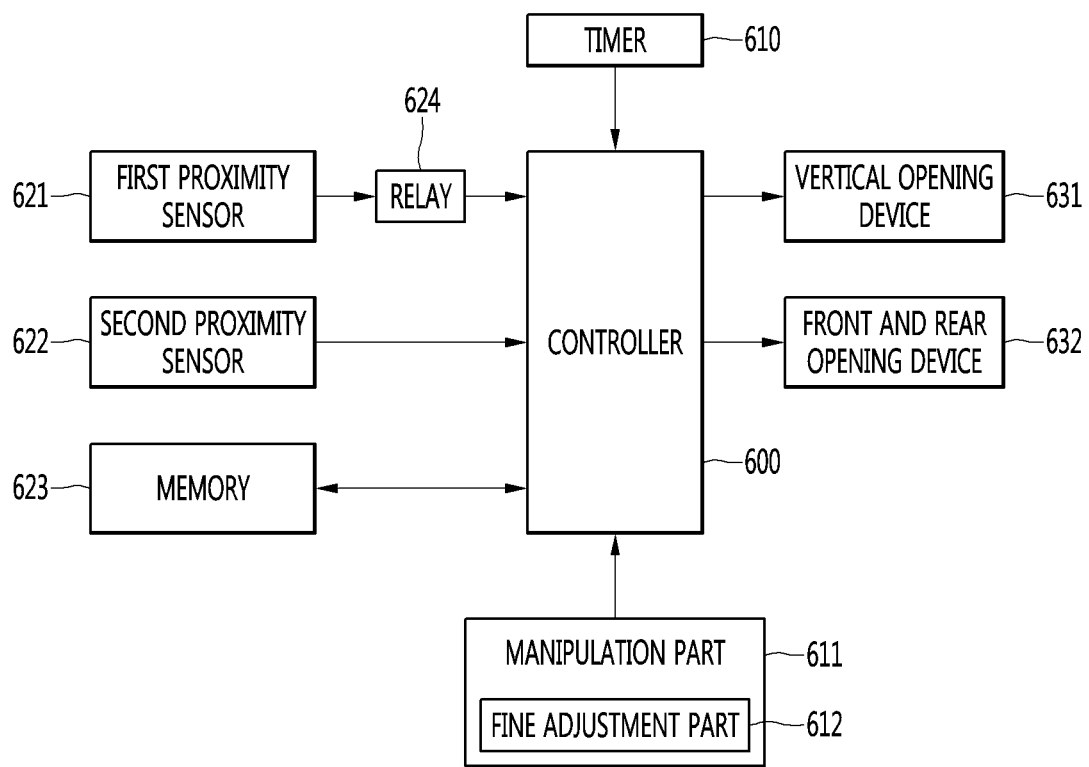
FIG. 20 is an electrical schematic diagram of a leg care apparatus according to another embodiment.

FIG. 20 is an electrical schematic diagram of a leg care apparatus according to another embodiment. FIG. 20 is characterized in that other components are added to the electrical schematic diagram of the leg care apparatus of FIG. 11. Therefore, the description of FIG. 11 is to be applied as it is without specific description.

Referring to FIG. 20, a relay 624 is further provided between the first proximity sensor 621 and the controller 600. The relay 624 may delay the signal transmission by waiting for a predetermined time, for example, about 2 seconds or more, to transmit the sensing signal sensed by the first proximity sensor 621 to the controller 600. Even if the first proximity sensor 621 senses the user's access, if the sensing signal is delayed for a predetermined time and the signal is transmitted a signal to the controller, the user may move to a correct position and adjust to the desired position more accurately. In addition, the user may prepare movement of sitting on the chair at the correct position during the waiting time. The delay operation may be understood as waiting for a sufficient time in consideration of the fact that cognitive ability may be degraded in the elderly.

The relay 624 may be provided to obtain the accuracy and reliability of the delay operation even when the timer 610 is separately provided.

To avoid an interference between the members, it has been described that the upper module 200 is opened earlier than the side module 300.

In addition to this purpose, the upper module 200 is a module that is moved upwards and is not related to collision with the user. On the other hand, the side module 300 is a module that is moved forward and in collision course with the user. As one way of improving the above-described limitation, the user may anticipate and prepare the side module 300 to be opened by moving the upper module 200 upward. For example, when the upper module 200 is moved, the side module 300 may be subsequently opened, and thus, the user may evacuate their leg to a safe place.

Since the operation of other constituents has already been described, the description thereof is omitted.

The control method according to another embodiment is substantially the same as the control method of FIG. 12. However, the control method according to this embodiment is different from the control method of FIG. 12 in that, after the user is sensed by the first proximity sensor, the delay signal is transmitted to the controller after being delayed by the relay, and the side module 300 is opened later than the upper module 200 to enhance the user's recognition.

In the leg care apparatus according to the embodiment, an action space adjustment module adjusts a size of an action space and adjusts an inlet of the action space. The user enjoys the foot bath by using hot and cold air by inserting their leg into the action space.

Since the action space adjustment module is operated automatically, the user may use the leg care apparatus more conveniently. The action space adjustment module is convenient in use because the action space adjustment module is operated automatically using a motor, but there is a limitation that the action space adjustment module cannot be used when power is cut off. If the power is cut off while the user is enjoying the foot bath, it may cause burn and frostbite or may lead to serious injury.

The above situation may occur in case of power failure. In addition, since the leg care apparatus according to an embodiment is a device that is capable of being moved by a wheel, it may also occur by moving the device unconsciously while the device is in use, and the plug is pulled out.

Hereinafter, another embodiment in which the leg care apparatus prevents a risk that may occur in the case of the power supply failure as described above is proposed.

Figure 21:
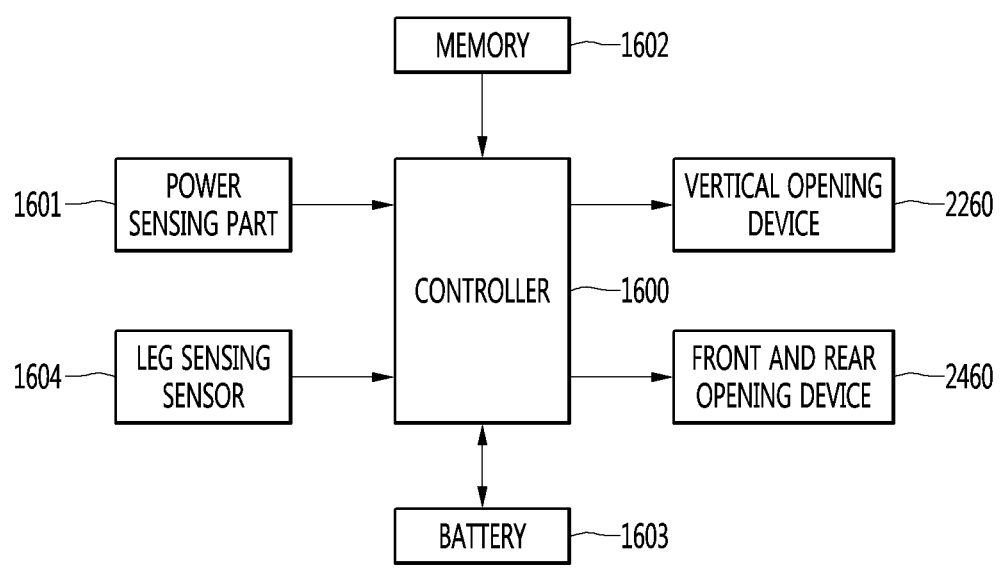
FIG. 21 is an electrical schematic diagram of a leg care apparatus according to another embodiment.

FIG. 21 is an electrical schematic diagram of a leg care apparatus according to another embodiment. Components not specifically mentioned in FIG. 21 are assumed to apply to the description of the original embodiment, and their description is omitted.

Referring to FIG. 21, a power sensing part 1601 for sensing power supply from the outside connected to a power supply such as a plug and a leg sensing sensor 1604 for sensing a user's leg may be applied as sensing devices of the apparatus.

A vertical opening device 2260 and a front and rear opening device 2460 may be provided as constituents for operating an action space adjustment module.

A battery 1603 providing emergency power when the external power is cut off and a memory 1602 storing information necessary for an operation of the leg care apparatus may be provided.

In a state in which the leg care apparatus is in use, the leg may be sensed by a leg sensing sensor 1604. The leg sensing sensor 1604 may be provided in the form of a proximity sensor or the like provided in the action space. A state in which the leg is sensed, and the leg care apparatus is in use may be stored in the memory 1602.

The sensing of the user's leg may be automatically identified by operating the action space adjustment module and storing the state in which a plurality of actions for the foot bath are performed in sequence in the memory. That is to say, a progress of the sequence for the foot bath performed after the user's leg is inserted into the action space may be identified by being stored in the memory.

The external power supply may be interrupted while the leg care apparatus is in use. As described above, the interruption of the external power supply may be caused by power failure of the entire house, a plug pulled out by the movement of the leg care apparatus, and the like.

The interruption of the external power supply may be sensed by the power sensing part 1601. The power sensing part 1601 may be a voltage sensor connected in parallel to a power supply line.

A signal of the power supply interruption may be transmitted to the controller 1600 by the power sensing part 1601. The controller 1600 may determine whether the user has a leg in the action space from the memory 1602 to perform an additional instruction.

According to the information read out from the memory 1602, if it is determined that the user's leg is placed in the action space, an emergency operation is started.

The emergency operation may be to open the vertical opening device 2260 and the front and rear opening device 2460 by using the power of the battery 1603. The emergency operation may be an operation of opening the inlet 510 of the action space so that the user removes their leg from the action space.

The user may determine that the action space adjustment module is opened and may remove their leg from the action space.

The emergency operation described above may be provided in a sequence that is automatically performed when there is external power interruption from the outside. Accordingly, the user may conveniently use the leg care apparatus.

In this case, since the inlet 510 is opened, and the leg may be pulled out in the case of the external power interruption, the following advantages may be clearly understood.

First, when the leg care apparatus is not operating due to the external power interruption, the user may remove their leg without embarrassment. Accordingly, since the leg is not pulled out in the closed state of the inlet, the user need not handle the leg care apparatus by force. The excessive handling of the device by the user may lead to a greater accident, and in the case of the elderly, this is not preferable because it could lead to a greater injury, such as a fall.

Second, it is possible to prevent the user from being injured due to an undesired operation. For example, the user may be burned if the leg care apparatus is not operating due to the external power interruption, for example, at the time when cooling is to be performed after a high temperature heating operation has been performed. The same may be applied to a case of a low temperature.

As described above, according to this embodiment, it is possible to prevent the leg inside the action space from being trapped due to the external power supply interruption.

Figure 22:
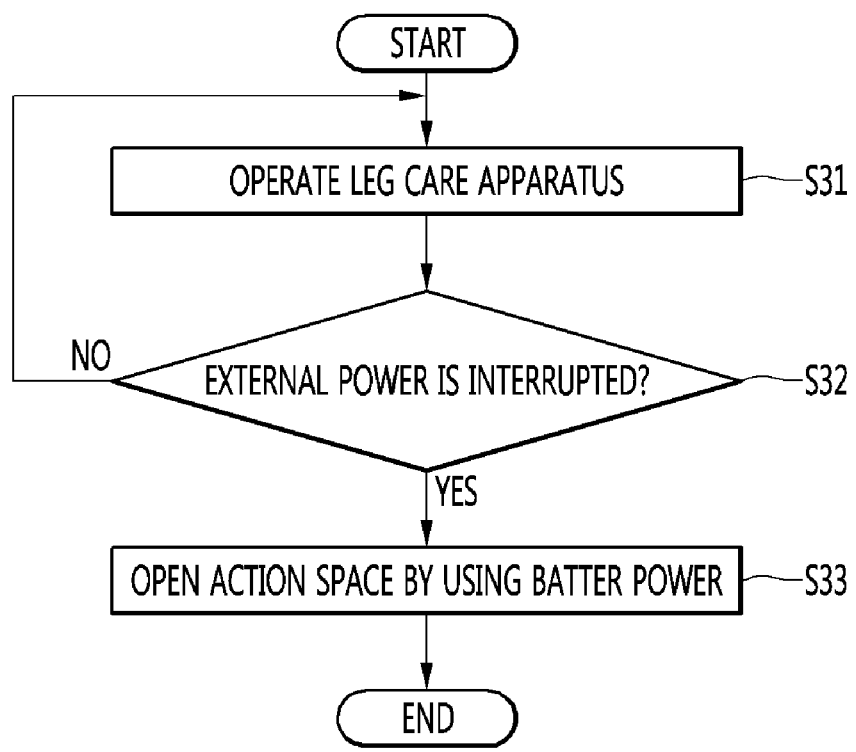
FIG. 22 is a flowchart for explaining a method for controlling the leg care apparatus according to an embodiment.

FIG. 22 is a flowchart for explaining a method for controlling the leg care apparatus according to an embodiment.

Referring to FIG. 22, an operation of the leg care apparatus according to an embodiment is started (S31). Here, the user's leg may be in a state of being inserted into the action space of the leg care apparatus.

Thereafter, the power may be cut off while the leg care apparatus is in operation (S32). Here, the interruption of the power supply may include power failure as well as the plug being pulled out of the outlet due to unexpected movement of the leg care apparatus.

The trapping of the leg inside the action space of the leg care apparatus may cause injury to the user. Therefore, here, the power may be supplied from the battery built in the leg care apparatus, and thus, an emergency operation may be performed to open the action space (S33).

When the action space is opened due to the emergency operation, the user may easily remove the leg from the inside of the action space. Therefore, it is possible to prevent injury due to the excessive handling of the apparatus, thereby preventing burns or frostbite due to respective hot and cold air remaining inside the apparatus.

Another embodiment included in the spirit of the present disclosure is further described.

One of the upper module 200 and the side module 300 may not be provided. Thus, only one of the upper module 200 and the side module 300 may be opened so that the user inserts a leg into an action space. In this case, there is a limitation that the user's inconvenience slightly increases, but the operation and action of the leg care apparatus is not impossible. Nevertheless, the embodiment in which both the upper module 200 and the side module 300 are provided is most preferable for the convenience of the user.

One of the foot contact pad 421 and the calf contact pad 331 may not be provided. Thus, even if only one contact pad is used, heat and cold air may be transferred to the legs by other heat transfer part. In this case, there is a limitation that the user's inconvenience slightly increases, but the operation and action of the leg care apparatus is not impossible. Nevertheless, the embodiment in which both the foot contact pad 421 and the calf contact pad 331 are provided is most preferable for the convenience of the user.

Although the atomizer is described as being provided to the bottom module, the embodiment is not limited thereto, and thus, the atomizer may be provided below or above the main body.

According to the present disclosure, even the elderly may conveniently care their leg thereof by using the foot bath. In particular, since the handling difficulties caused when using a lot of water is eliminated, even people with limited mobility may use the leg care apparatus conveniently.

In particular, the elderly who suffer from orthopedic diseases may reduce the pain without relying on drugs and may perform the minimum movement that is necessary for the operation of the apparatus.

In addition, since the elderly conveniently operates each module to suit their own convenience, the leg care apparatus may be used more conveniently.

According to the present disclosure, it is possible to prevent the user's legs from being trapped inside the action space, thereby assisting the safe use of the apparatus.

According to the embodiment, the user may adjust the size and the like of the leg care apparatus to be suitable for his/her own body and conveniently operate the leg care apparatus.

According to the embodiment, since the leg car apparatus is safely used even in high humidity environment, the risks of the burns and/or the electric shock may be reduced.

According to the embodiment, the use may conveniently move the leg care apparatus, and the leg care apparatus may be conveniently used in the narrow indoor space due to the compact size thereof.

According to the embodiment, the leg care apparatus may include the firm frame so as to be used for a long time without being damaged.

According to the embodiment, since the heat atmosphere of the heating element is transmitted to the feet in various manners such as conduction, convection, and radiation, the foot bath effect may be improved, and the user's satisfaction may increase.

According to the embodiment, since the hot and cold air are directly transferred to the portion at which the hot and cold air are required, a more improved foot bath effect may be obtained, and the energy consumption may be saved.

According to the embodiment, since the door of the leg care apparatus may be automatically operated, the elderly may use leg care apparatus conveniently.

According to the embodiment, the leg care apparatus may also be used as a side table, in particular, may be used more conveniently in a room.

According to the embodiment, the leg care apparatus may be used not only as a foot bath, but also as a household appliance having the general multifunction, and thus, the user may use the leg care apparatus more variously. In particular, while using the leg care apparatus, the user may read a book by placing the book on the leg care apparatus.

According to the embodiment, when the leg care apparatus stops operating due to power failure, the leg care apparatus may perform emergency operation and the operation may be safely terminated without potential injuries to the user.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement which are within the scope of the disclosure, the drawings and the appended claims. In addition to variations and modifications in the component parts and/or arrangements, alternative uses will also be apparent to those skilled in the art and are within the scope of the claims.

What is claimed is:

1. A leg care apparatus comprising:
   a main body configured to provide an action space to accommodate a leg;
   an action space adjustment module configured to adjust a size of an inlet of the action space;
   at least one proximity sensor configured to sense a user's access; and
   a controller configured to control the action space adjustment module in response to the sensing of the at least one proximity sensor,
   wherein the action space adjustment module comprises an upper module configured to define at least a portion of a top surface of the action space, the upper module being configured to open or close the inlet; and
   wherein the controller is configured to control the upper module to slide vertically upward to open the inlet according to the sensing of the at least one proximity sensor.

2. The leg care apparatus according to claim 1, wherein the at least one proximity sensor comprises at least one of:
   a first proximity sensor configured to sense the user's access from an outside of the action space; and
   a second proximity sensor configured to sense that a user is located within the action space.

3. The leg care apparatus according to claim 1, wherein the action space adjustment module comprises at least one of:
   a side module configured to define at least a portion of a front surface of the action space, the side module being configured to open or close the inlet.

4. The leg care apparatus according to claim 3, wherein the controller is configured to control the side module to open the inlet according to the sensing of the at least one proximity sensor.

5. The leg care apparatus according to claim 1, wherein the at least one proximity sensor comprises:
   a first proximity sensor configured to sense the user's access from a front side of the action space; and
   a relay configured to delay a sensing signal of the first proximity sensor to the controller, and thereby the sensing signal of the first proximity sensor to the controller is delayed.

6. The leg care apparatus according to claim 5, wherein the action space adjustment module including a side module is configured to define at least a portion of a front surface of the action space, the side module being configured to open or close the inlet,
   wherein the first proximity sensor is disposed at the side module within a range of one-third of a center with respect to a left and right length of the side module.

7. The leg care apparatus according to claim 5, wherein the first proximity sensor has a sensing range having a fan shape.

8. The leg care apparatus according to claim 1, wherein the at least one proximity sensor comprises:
   a second proximity sensor configured to sense the user's access into the action space; and
   a relay configured to delay a sensing signal of the second proximity sensor to the controller, and thereby the sensing signal of the second proximity sensor to the controller is delayed.

9. The leg care apparatus according to claim 8, wherein the upper module is configured to define at least a portion of a top surface of the action space,
   wherein the second proximity sensor is disposed at the upper module within a range of one-third of a center with respect to a left and right length of the upper module.

10. The leg care apparatus according to claim 8, wherein the second proximity sensor is disposed to sense at least one of user's abdomen or thigh.

11. The leg care apparatus according to claim 1, wherein the upper module is configured to define at least a portion of a top surface of the action space,
   wherein a manipulation part includes a side table mode part configured to move the upper module upward to a preset height so that a top surface of the upper module is used as a side table.

12. The leg care apparatus according to claim 11, wherein the manipulation part includes a memory setting part configured to remember a present state of the action space adjustment module.

13. The leg care apparatus according to claim 11, further comprising an upper portion top surface part disposed to be flat on an upper portion of the upper module.

14. The leg care apparatus according to claim 13, wherein the upper portion top surface part comprises at least one of:

a wireless charging part configured to wirelessly charge an electronic equipment;

a water supply part configured to receive water; and a display configured to display information.

15. The leg care apparatus according to claim 1, further comprising:

a power sensing part configured to sense an interruption of an external power to the leg care apparatus; and a battery configured to store energy, wherein the controller is configured to control the action space adjustment module to open the action space when the interruption of the external power is sensed by the power sensing part during a leg care of a user.

16. The leg care apparatus according to claim 15, wherein the controller is configured to control the action space adjustment module to open the action space when the user is sensed by the at least one proximity sensor.

17. The leg care apparatus according to claim 16, further comprising a memory in which a progress of a sequence for the leg care is stored.

18. A method of operation by a leg care apparatus, the method comprising:

sensing a user's access adjacent to the leg care apparatus from the outer environment;

automatically opening an inlet of the leg care apparatus by the sensing of the user's access;

sensing a state in which a user's leg is disposed in an action space of the leg care apparatus through the inlet; and automatically closing the inlet.

19. The method according to claim 18, further comprising:

sensing the user's access through a first proximity sensor;

delaying a user sensing signal of the first proximity sensor to a controller, through a relay;

sensing a state, in which the user's leg is inserted into the action space, through a second proximity sensor; and delaying a user sensing signal of the second proximity sensor to the controller, through the relay.

20. A method of operating by a leg care apparatus, in which an inlet of an action space is adjusted by an action space adjustment module, the method comprising:

starting an operation of the leg care apparatus based on a determination that a user's leg is in the action space in which the inlet is closed by the action space adjustment module; and automatically opening the inlet by the action space adjustment module when an external power is cut off.

* * * * *